US006484196B1

(12) United States Patent
Maurille

(10) Patent No.: US 6,484,196 B1
(45) Date of Patent: *Nov. 19, 2002

(54) INTERNET MESSAGING SYSTEM AND METHOD FOR USE IN COMPUTER NETWORKS

(75) Inventor: Mithras C. Maurille, San Francisco, CA (US)

(73) Assignee: Advanced Web Solutions, Concord, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,280

(22) Filed: Mar. 20, 1998

(51) Int. Cl.⁷ .......................... G06F 15/16; H04L 12/16
(52) U.S. Cl. ....................... 709/206; 709/218; 370/260
(58) Field of Search ............................... 709/206, 207, 709/218, 219; 379/93.01, 93.02; 345/113, 150, 329, 330, 331; 370/260

(56) References Cited

U.S. PATENT DOCUMENTS

| 5,206,934 A | 4/1993 | Naef, III ..................... 395/200 |
| 5,208,912 A | 5/1993 | Nakayama et al. ......... 395/200 |

(List continued on next page.)

OTHER PUBLICATIONS

"Instant Messaging Comes of Age", Jon Swartz, San Francisco Chronicle, Jan.20, 1998, 1 page.
"Prying Open Groupware", Tony Pompili, PC Magazine, Feb. 24, 1998, 3 pages.
"Lotus Development Corp.: Lotus Notes Release 4.1", Tony Pompili, PC Magazine, Oct. 8, 1996, 6 pages.

(List continued on next page.)

Primary Examiner—Zarni Maung
Assistant Examiner—Jason D. Cardone
(74) Attorney, Agent, or Firm—Dorsey & Whitney LLP

(57) ABSTRACT

A system and method that provides integrated combinations of threaded instant messages, open display bulletin boards, private bulletin boards, threaded e-mail, explicit acknowledgment of messages, and conferencing, whisper and talk modes. The system can be implemented in any Internet-based computer network, including the Internet, intranets and extranets. System components include a server application, a client application and a data repository maintained by the server. The server records in the data repository pertinent information regarding all communications between and requests issued by system users, and handles the communications and requests cooperatively with the client application in accordance with the system mode being exercised (e.g., talk, conferencing, whisper, mail, messaging, open display, private bulletin boards, etc.). In an embodiment where the server and client applications are web based, the server application sends all information to the client application in the form of web pages, which the user of the client can view and respond to using a browser. For example, when implementing open display, the server application formats the messages sent to a user so that the messages' contents are directly displayed on a bulletin board along with threading information. As another example, when implementing private bulletin boards, the server application creates private message boards for each user that allow each user to access only those messages in which he participates (as sender or recipient). When a user acknowledges a message, the server application closes the thread including the message and permits no additional activity in that thread.

45 Claims, 17 Drawing Sheets

U.S. PATENT DOCUMENTS

| | | | | |
|---|---|---|---|---|
| 5,404,488 A | | 4/1995 | Kerrigan et al. | 395/425 |
| 5,577,247 A | | 11/1996 | Uyama et al. | 395/611 |
| 5,600,834 A | | 2/1997 | Howard | 395/617 |
| 5,630,116 A | | 5/1997 | Takaya et al. | 395/617 |
| 5,684,984 A | | 11/1997 | Jones et al. | 395/610 |
| 5,794,039 A | * | 8/1998 | Guck | 707/103 |
| 5,799,151 A | | 8/1998 | Hoffer | 395/200 |
| 5,805,830 A | * | 9/1998 | Reese et al. | 709/205 |
| 5,862,325 A | | 1/1999 | Reed et al. | 395/200 |
| 5,905,863 A | * | 5/1999 | Knowles et al. | 709/206 |
| 5,913,059 A | * | 6/1999 | Torii | 709/104 |
| 5,923,846 A | * | 7/1999 | Gage et al. | 709/213 |
| 5,990,887 A | * | 11/1999 | Redpath et al. | 345/758 |
| 6,101,532 A | * | 8/2000 | Horibe et al. | 709/206 |
| 6,105,055 A | * | 8/2000 | Pizano et al. | 709/204 |
| 6,122,632 A | * | 9/2000 | Botts et al. | 707/10 |
| 6,161,149 A | * | 12/2000 | Achacoso et al. | 710/4 |
| 6,182,117 B1 | * | 1/2001 | Christie et al. | 709/205 |
| 6,233,600 B1 | * | 5/2001 | Salas et al. | 709/201 |

OTHER PUBLICATIONS

"Collaboration at its Best", Nicole Shotland, Lisa L. Sweet, Internet Computing, Aug. 1998, 2 pages.

"Collabra: Messaging and Messenger", Scot Hacker, ZDNet, Sep. 21, 1997, 2 pages.

"Collabra: Good things", Scot Hacker, ZDNET, Sep. 21, 1997, 2 pages.

"It's not your grandfather's groupware", Matt Kramer, PC Week, Oct. 28, 1996, 8 pages.

"ichat Inc: Message Boards", Heath H. Herel, PC Magazine, Feb. 24, 1998, 3 pages.

"Lundeen & Associates: Web Crossing", Health H. Herel, PC Magazine, Feb. 24, 1998, 3 pages.

"Bryan Higgins Software: Motet Conferencing Software", Heath H. Herel, PC Magazine, Feb. 24, 1998, 3 pages.

"Outlook Gets Organized", Ed Bott, PC Computing, Feb. 1998, 3 pages.

* cited by examiner

═══════ Arlene's Message Board ═══════

Current messages: 16     10-21-97     Open messages: 5

☐ 10-16-97 14:32 To: Arlene From: Mit CC: Ulysses     442A
Re: 145 Piccadilly
Pls order 3R report on 145 Piccadilly and give copy to Agnes.     420-1

◇ 10-17-97 9:24 To: Mit From: Arlene CC:     ✿Ack: 10-17 12:45
Re: 145 Piccadilly
3R report ordered. Will give copy to Agnes upon receipt.     444A

460A

☐ 10-17-97 9:30 To: Agnes From: Arlene CC: ✿Ack: 10-18 8:10
Re: 145 Piccadilly
Have ordered 3R report. Will forward to you upon receipt.

◇ 10-18-97 8:10 To: Arlene From: Agnes CC: ✿Ack: 10-18 9:45
Re: 145 Piccadilly
Just let me know when you have 3R in hand. I'll come pick it up.

☐ 10-20-97 10:47 To: Arlene From: Mit CC:
Re: 233-G Boardwalk
Call sellers for copy of TDS and Supp. TDS on 233-G Boardwalk.

◇ 10-20-97 16:10 To: Mit From: Arlene CC:     ✿Ack: 10-20 18:20
Re: 233-G Boardwalk
Sellers on Boardwalk will have TDS and Supp ready by tmo. do you want to order smoke detector inspection?

462A

○ 10-20-97 18:20 To: Arlene From: Mit CC:     ✿Ack:
Re: 233-G Boardwalk
No need. This one's exempt from smoke detection inspection.

☐ 10-20-97 14:35 To: Arlene From: Ulysses CC:
Re: 45 Menlo
Change Listing Price on 45 Menlo to $205,000 and update MLS.

☐ 10-20-97 14:47 To: Arlene From: Ulysses CC:
Re: 145 Northwood
Extend Listing Expiration Date to February 28, 1998 on 145 Northwood ☐ 10-20-97 15:10 To: Mit From: Arlene CC:
Re: 410 Boardwalk #3
I need copies of Listing Agreement. TDS, Disclosures, etc. on 410 Boardwalk #3

FIG. 4C

CONFERENCE MODE IMPLEMENTATION 770

CONFERENCE SESSION
ROOM 6151
10-28-97

Display Board 772

| Topic: Company Christmas Party | Moderator: | Arlene |

XYZ Corp.
Company Christmas Party
AGENDA

I. Logistics
   A. Setup
   B. Registration
   C. Entertainment

II. Finances
   A. Band vs. DJ
   B. Dinner Costs
   C. Santa Rental
   D. Gift Exchange

[PRINT]  [HIDE]  [MODIFY]  [SEND]

Comment Screen 774     Participants 776

Frm: Arlene - I think we should ask Larry to play Santa again. He did such a good job last year. The kids loved him!
Frm: Mit - Yes. I agree. Agnes, can you give him a call and ask him if he's available on Dec 19th?
>>>Ulysses has joined the session.<<<
Frm: Agnes - Okay, I'll call him tomorrow. What about caterers?
Frm: Arlene - Nico did a wonderful job for our Appreciation Party last month; I think we should use him again!
Frm: Ulysses - Hey, everyone. Sorry I'm late. Came from a long meeting.
Frm: Mit - Glad you can join us, Uly! we need your input.
>>>Sammy has left the session.<<<
Frm: Arlene - Uly, I posted an agenda on the board for everyone to see. We're on #2 right now. Well, kinda.

Arlene
Agnes
Mit
Ulysses
Sammy
David
Alice
Nicolas
Isabel
Larry

[SEND] [Y] [N] [ANON]

[HOLD MESSAGES] [STORE SESSION] [CHANGE SESSIONS] [PRINT MINUTES] [EXIT SESSION]

FIG. 7C

MAIL MODE IMPLEMENTATION

| | | Mit's Mail Folder | | |
|---|---|---|---|---|
| Folder: Personal/misc | | 10-27-97 | | eMail Account: mitmaur |

Mail You've Received: 47   912

| | Date/Time | Subject | Sender | Size | | |
|---|---|---|---|---|---|---|
| ✉ | 10-27 1:16Pz | Toastmaster's Meeting | DVaughn@d4tm.org | 23K | 📂 | ✕ |
| | 906a — 10-29 12:55P | 2K | | | | |
| ✉ | 10-27 11:43A | Looking for property to buy | tomthumb@aol.com | 2K | 📂 | ✕ |
| | 908a — 10-29 1:16P | 6K | | | | |
| ✉ | 10-27 8:15A | New pricing schedule | HYoung@cnet.com | 18K | 📂 | ✕ |
| ✉ | 10-26 5:36P | Company Hiring Policy Review | amy_wang@polka.com | 34K | 📂 | ✕ |
| | 910a — 10-26 8:37A | 4K | | | | |
| ✉ | 10-26 3:27P | Revise Monthly Statement | WBill@cnet.com | 18K | 📂 | ✕ |
| ✉ | 10-26 3:05P | 1998 Company Picnic | HLee@webtv.com | 22K | 📂 | ✕ |

Mail You've Sent: 22

| | | Date/Time | Subject | To | Size | | |
|---|---|---|---|---|---|---|---|
| ⊙ | 📄 | 10-27 1:16P | News about Maggie | Ross@Bayinsider.com | 6K | 📂 | ✕ |
| | 📄 | 10-27 12:31P | Calendar Orders will be delayed... | Benas@work4u.com | 11K | 📂 | ✕ |
| | 📄 | 10-26 11:19A | Mom's Cooking | minorlom@aol.com | 3K | 📂 | ✕ |
| ⊙ | 📄 | 10-25 3:09P | Cool Web Sites I Found | BillyGates@msn.com | 38K | 📂 | ✕ |
| ⊙ | 📄 | 10-21 12:06P | Vacation Plans | MNubla@kron.com | 12K | 📂 | ✕ |
| ⊙ | 📄 | 10-16 7:23A | Operating Committee Meeting | DVaughn@d4tm.org | 22K | 📂 | ✕ |
| | 📄 | 10-16 8:12A | Reader's Digest article about the ... | HJHughes@ccnet.com | 5K | 📂 | ✕ |
| | 📄 | 10-12 1:09P | Marketing Presentations | CFigueroa@webtv.com | 29K | 📂 | ✕ |

[ Move Groups ] [ Sort Folder ] [ Edit Folder ] [ Cancel ]
[ Check Other Folder ] [ Check Other Account ]

FIG. 9

INTERNET MESSAGING SYSTEM AND METHOD FOR USE IN COMPUTER NETWORKS

The present invention relates generally to electronic communication systems for use in computer networks and, particularly, to bulletin boards, instant messaging systems, electronic mail and chat rooms.

BACKGROUND OF THE INVENTION

An electronic communication system for use in enterprise and other collaborative environments would ideally include a suite of capabilities that facilitate decision making and communication by two or more individuals. Such capabilities could include:

enabling users to view the history of multiple conversations with multiple parties (referred to hereinafter as "conversation history");

enabling users to view messages as soon as they are available without requiring the users to log onto a public bulletin board system (BBS) (referred to hereinafter as "instant access");

enabling users to view the content of messages without requiring that the messages first be selected (referred to hereinafter as "open display");

enabling users to conduct their conversations in privacy so that each user is the only person who can view the history and content of their respective multiple conversations (referred to hereinafter as "private conversations");

enabling users to undeniably agree to proposals made in the course of a conversation in such a way that the conversation is concluded (referred to hereinafter as "agreement"); and enabling users to participate in moderated conferences or informal chats, as well as in conversations (referred to hereinafter as "integrated modes").

Prior art electronic systems, which include electronic mail (e-mail), bulletin board systems (BBS), instant messaging and chat rooms, offer some but not all of these capabilities and, as a result, are less then ideally suited to enterprise communications. The capabilities of these various communication systems are presented in Table 1.

TABLE 1

| System | Conversation History | Instant Access | Open Display | Private Conversations | Agree't | Integrated Modes |
|---|---|---|---|---|---|---|
| E-mail | No | Yes | No | Yes | No | No |
| BBS | Yes | No | No | No | No | No |
| Instant Messaging | No | Yes | Yes | Yes | No | No |
| Chat | No | Yes | Yes | No | No | No |

Referring to Table 1, e-mail systems offer instant access to messages, but the messages must be selected and opened by the recipient (typically with a mouse click) to be viewed. E-mail messages are private as they are directed to specific recipients (one or many). No viewable history is available for E-mail messages except for the most rudimentary kind wherein a message being replied to can be copied into the body of the response. E-mail has only one mode and includes no feature whereby an e-mail user can issue a formal agreement to a proposal contained in a message, other than so stating in a reply message; e.g., "I agree to your proposal of Dec. 10, 1997 on the subject of contract terms."

Like e-mail systems, bulletin board systems (BBS) do not provide open display, agreement, or integrated mode capabilities. Unlike E-mail systems, BBS display messages in a threaded format wherein a topic is listed first and all messages germane to that topic are listed below the topic with different levels of indentation indicating historical and logical relationships between the related messages. For example, a BBS might display a topic and two messages on the topic, the first having an associated comment, as follows:

Topic: Discussion of X
   Message 1
      Comment on Message 1
   Message 2

Because BBS do not provide open display, a user must select a message or comment to read that message or comment. BBS are centralized systems, meaning that a user must actually log in to the BBS to view topics and messages. As a result, messages are not immediately accessible (i.e., to read messages on a topic of interest a user must first access the BBS). Also, BBS are anything but private; typically, the same bulletin board is available to all users, meaning that all messages are accessible to all users.

Instant messaging systems allow users to communicate privately in real time over a network connection. An example of such a system is America On Line's "Instant Messages" feature, which allows an AOL member who is online to communicate with another member who is also online at the same time. Messages are openly displayed (i.e., without needing to be selected first). Thus, instant messaging systems provide private conversations, immediate access and open display capabilities. However, instant messaging systems do not support conversation history, agreement or integrated modes. Moreover, instant messaging systems are for one-on-one communication only.

Chat systems allow a group of users to enter a chat room and then engage in a group conversation. The group conversation can be moderated or un-moderated. Like instant messaging, chat systems are for informal communications and do not provide conversation history, agreement or integrated modes. Also like instant messaging, chat systems openly display all messages. However, chat messages are not immediately accessible as a user needs to enter a chat room before they can view messages. Also, chat rooms are not private as anyone in the chat room can read all chat messages typed by users in that room.

Consequently, there is a need for an enterprise communication system that provides features and/or combinations of features not present in prior art electronic communication systems.

SUMMARY OF THE INVENTION

In summary, the present invention is a electronic communication system that provides features and/or combinations of features not present in prior art electronic communication systems. In particular, the present invention is a communication board system with multiple modes in which the communication board system can be variously configured as:

a threaded instant message system (conversation history plus instant access capabilities);

an open display bulletin board system (conversation-history plus open display capabilities);

private message boards (conversation history plus private conversations capabilities);

a system allowing message locking (conversation history plus agreement capabilities); and a threaded mail system.

The preferred embodiment of the system is implemented as a client server system including a server application, a client application and a data repository resident on the server. In the preferred embodiment a sender requests communication services using his client application, which relays the request to the server program. The server program updates the data repository to reflect the request and then issues an appropriate message to the client application of one or more recipients, depending on the requested communication services. Any response by a recipient is cooperatively handled by the client and server applications in the same manner as the initial request. All communications activities are moderated by the server application and recorded in the data repository.

The data repository is preferably structured as a set of relational database tables, including a users table and a messages table. The users table lists characteristics of all system users, including unique ID, name and preferences. The messages table lists characteristics of each message issued by users, including a unique message ID, threading information (parent and child message IDs) sender and recipient name, subject, status of the message (unread, read, responded, acknowledged, etc.), type of message (thread, invitation, confirmation, log), miscellaneous flags, and the name of the file where the message text is stored on the server.

In the preferred embodiment a sender sends a message to a recipient by filling in a send message template displayed by the client application, which relays the completed message information to the server application. Upon receiving the message information the server application stores the pertinent information (sender, recipient, subject) in the messages table, updates message status fields and threading information for the same message table record, stores the message text in a file, and issues the client application of the intended recipient a pending-message alert. Preferably, the server application sends the pending-message alert only when the users table indicates that the recipient is online, although this is not a requirement of the present invention. The client application gives the recipient an opportunity to do nothing, cancel the alert, or accept the message. If the user does nothing, the server resends the alert at some prescribed interval. If the user cancels the alert, the server will not resend the alert and places the message on hold. If the user accepts the message, the server sends the relevant message information to the client application to be accessed by the recipient.

When the preferred embodiment is configured as a private message board system, each user interacts with the communication system via a private bulletin board in which the client application instantly displays the history and content of all messages associated with conversations in which the respective user is a party. In this configuration the present invention supports multiple instances of instant messaging, meaning that it provides private bulletin boards for multiple users and is able to allow each of the multiple users to exchange instant messages with one or more other users. In this case the relevant message information returned by the server application to the intended recipient includes threading information, which enables the client application to display the message's history along with that of other messages. Preferably, the client application displays the messages in open format; however, the client application could also display the messages in the conventional format.

Once a recipient has accepted a message, he can reply to or acknowledge the message. The message reply feature is implemented cooperatively by the client and server applications in the same manner as the message send feature. Message acknowledge is a feature of the present invention wherein a conversation's thread is closed, indicating that the conversation has been concluded, typically with some agreement. For example, a user can indicate final acceptance of sales terms set out in the last of several threaded messages by acknowledging that message. The client application relays message acknowledge information to the server application, which updates the data repository by setting the message status to acked and closing the corresponding thread. Thus, the present invention allows the entire history of a negotiation to be preserved along with its final agreement.

The other system configurations can be implemented using the components of the preferred embodiment with minimal changes from the above description.

In the preferred embodiment, the client application is based on a web browser and the server application includes communication board software that performs all high level and data repository operations and web server software that decodes and encodes communications from and to the client web browser. Preferably, all communication board contents displayed to users are formatted as ACTIVE SERVER PAGES whose fields can be dynamically filled in by the user via the client web browser or by the server's communication board software using information from other users and/or the data repository.

Another feature provided by the preferred embodiment is message hyperlinking, which allows a user to form a response to any message shown on their private bulletin board by simply selecting a hypertext link identifying the message sender. In response to the selection of a hyperlink the client application generates the appropriate response screen with some of the fields (e.g., sender, recipient, subject) filled-in.

The preferred embodiment supports multiple integrated modes, including a threaded communications (message) mode, already described, talk mode, conference mode, whisper mode and mail mode. The present invention allows users to transition smoothly between the modes.

Conference mode allows users to participate in moderated or unmoderated conferences that are scheduled or unscheduled. Information regarding conference participants and scheduled time and moderator, if applicable, are stored by the server application in a conferences table within the data repository. When a user is to participate in a scheduled conference he is notified of the virtual conference room and time of the conference by the server application. The server application also creates the virtual conference room at the appropriate time, registers participants, and stores a log of the conference in the data repository. In a preferred embodiment conference mode conversations are unthreaded. Whisper mode is available to participants in a conference who wish to paricipate in a private, side conversation.

Talk mode allows users to participate in informal, unlogged conversations. In a preferred embodiment talk mode conversations are unthreaded.

Mail mode allows a user to send e-mail over the Internet with two levels of threading.

BRIEF DESCRIPTION OF THE DRAWINGS

Additional objects and features of the invention will be more readily apparent from the following detailed description and appended claims when taken in conjunction with the drawings, in which:

FIG. 4C is an image of a second private communication board screen on which instant messages owned by a second user are presented in a threaded, open format;

FIG. 7C depicts a conference screen displayed by client Web browsers 168 for all clients participating in a conference;

FIG. 9 depicts a mail screen displayed by client Web browsers that supports threaded Internet e-mail.

DESCRIPTION OF THE PREFERRED EMBODIMENT

Figure 1:
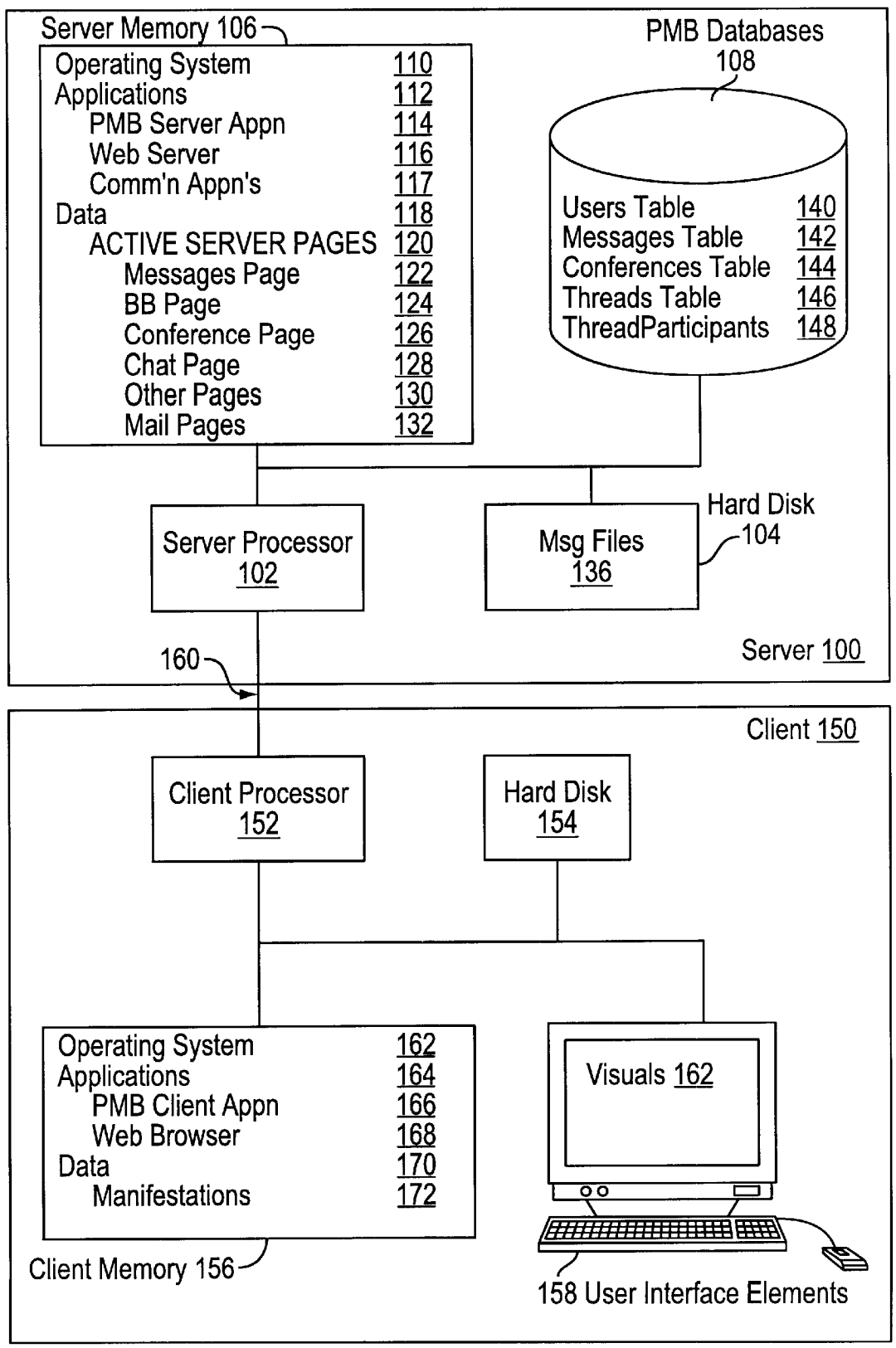
FIG. 1 is a block diagram of a preferred embodiment of the present invention.

Referring to FIG. 1, there is shown a block diagram of a preferred embodiment of the present invention. This embodiment includes a server 100 with a server memory 106, processor 102, hard disk 136 and database 108. The server memory 106 could be any combination of a RAM or cache memory and includes an operating system 110, application programs 112 and data 118. In accordance with well known principles, the processor 102 executes the applications 112 in the memory 106 under control of the operating system 110.

The applications 112 include a personal message board (PMB) server application embodying many of the teachings of the present invention and a web server 116, which could be any program configured to serve web content over a network. The applications 112 also include communications application 117, which are programs that employ features of the server application 114. The data 118 include ACTIVE SERVER PAGES (ASP) 120 that describe the contents of web pages through which clients 150 exercise the modes of the present invention, including messaging, conferencing (incorporating a whisper mode for conference participants), talk, and mail. The ASP 120 therefore includes a messages page 122, a conference page 124, a whisper page 126, a chat page 128, a mail page 130 and other pages 132 needed for miscellaneous client-server communications.

Message mode allows a user to interact with a private bulletin board in which his messages (i.e., any message involving the user as sender or recipient) are instantly available and displayed with full threading information. Message mode supports an acknowledge (Ack) reply which, when sent by a user in response to a particular message, closes the thread comprising the particular message and records the users acknowledgment that they read/accepted the message. Because each bulletin board is private, no user other than the authorized user can view its contents.

Conference mode allows users to participate in moderated or unmoderated conferences that are scheduled or unscheduled. Information regarding conference participants and scheduled time and moderator, if applicable, are stored by the server application in a conferences table within the data repository. When a user is to participate in a scheduled conference he is notified of the virtual conference room and time of the conference by the server application. The server application also creates the virtual conference room at the appropriate time, registers participants, and stores a log of the conference in the data repository. In a preferred embodiment conference mode conversations are unthreaded. Users involved in a conference can enter whisper mode, in which they can converse privately, without logging.

Talk mode allows users to participate in informal, unlogged conversations. In a preferred embodiment talk mode conversations are unthreaded. Mail mode allows a user to send threaded e-mail over the Internet. Each of these modes is integrated so that users can transition from one to the other.

In the preferred embodiment, the database 108 is a relational database system including tables organized to store information written and retrieved by the server application 114 in the course of its operation. The database tables include a users table 140, messages table 142, conference table 144, threads table 146 and a thread participants table 148. The tables 140–148 respectively store information on: system users (140), messages exchanged between users (142), conferences of users (144), mapping of messages to threads (146), and mapping of thread participants (users) to threads (148). These tables are described in depth in reference to FIG. 2. The hard disk 104 includes message files 136, which store the text of messages referred to by the messages table.

The embodiment shown in FIG. 1 also includes one or more clients 150, each of which is used by one or more users. The single client 150 shown is representative of the one or more possible clients. In the preferred embodiment, clients 150 are coupled to the server 102 via an intranet 160; however, the principles of the present invention are equally applicable to any type of network, such as the Internet, an extranet or combinations thereof. The client 150 and the server 100 exchange information over the network 160 using standard network protocols, such as TCP/IP and HTTP. In particular, the server application 114 makes available to users communication board services (encompassing private message boards, chat, talk, conferencing and mail) by transmitting to the clients 150 via the web server software 116 manifestations of the ACTIVE SERVER PAGES 120 and other web pages. These manifestations, when displayed by the clients 150, enable the users to view communications board information and messages from other users, and to issue requests and queries to the PMB application 114 via the web server software 116.

The client 150 includes a memory 156, processor 152, hard disk 154 and user interface elements 158, such as a display, keyboard and selection device. The memory 156 could be any combination of a RAM or cache memory and includes an operating system 162, application programs 164 and data 170. In accordance with well known principles, the processor 152 executes the applications 164 in the memory 156 under control of the operating system 162.

The applications 164 include a personal message board (PMB) client application 166 and a web browser 168. The web browser 168 receives, transmits and presents manifestations from the ASP 120 and other pages transmitted over the web by the server application 114 via the web server 116. The client application 166 provides additional processing capabilities not present in the web browser 168 to assist users in interacting with the communication board features. These additional processing capabilities can include: responding to alerts from the PMB application 114 when the user is not available, locally logging user sessions, maintaining a local address book for the user and issuing standard queries or requests to the server application 114. Note that simple implementations of the present invention can eliminate the PWB server application 166; in such an implementation all user interaction would be provided by the web browser 168. Because communications between the server 100 and clients 150 adhere to web standards and the key components of the present invention (i.e., the PMB server application 114 and PMB client applications 166, described below) are compatible with standard web software (i.e., the web server 116 and browser 168), the present invention can be implemented in any web based client server environment. Moreover, with slight modification, the server and client applications 114, 166 could be made compatible with any standard client/server communications packages (e.g., Novell, etc.).

The data include manifestations 172 of the ACTIVE SERVER PAGES (ASP) 120 downloaded by the web browser 168 in response to events or user requests. These manifestations (not shown in detail) enable the user to employ and interact with the features of the PMB server application, including the following modes: messaging, bulletin board, conferencing, chat, and mail. The manifestations are presented by the web browser 166 to users as visuals 162 and/or sounds 164 using the user interface elements 158.

The present invention is not limited to the described embodiment. In fact, the teachings of the present invention are applicable to any combination of current and/or future technology similar to that described herein. For just one example, the database 108 can be implemented using an object-oriented DBMS, flat text files stored on a hard disk 104, or other DBMS or non-DBMS solutions. Having generally described the preferred embodiment, the tables managed by the database system 108 are now described in reference to FIG. 2.

Figure 2:
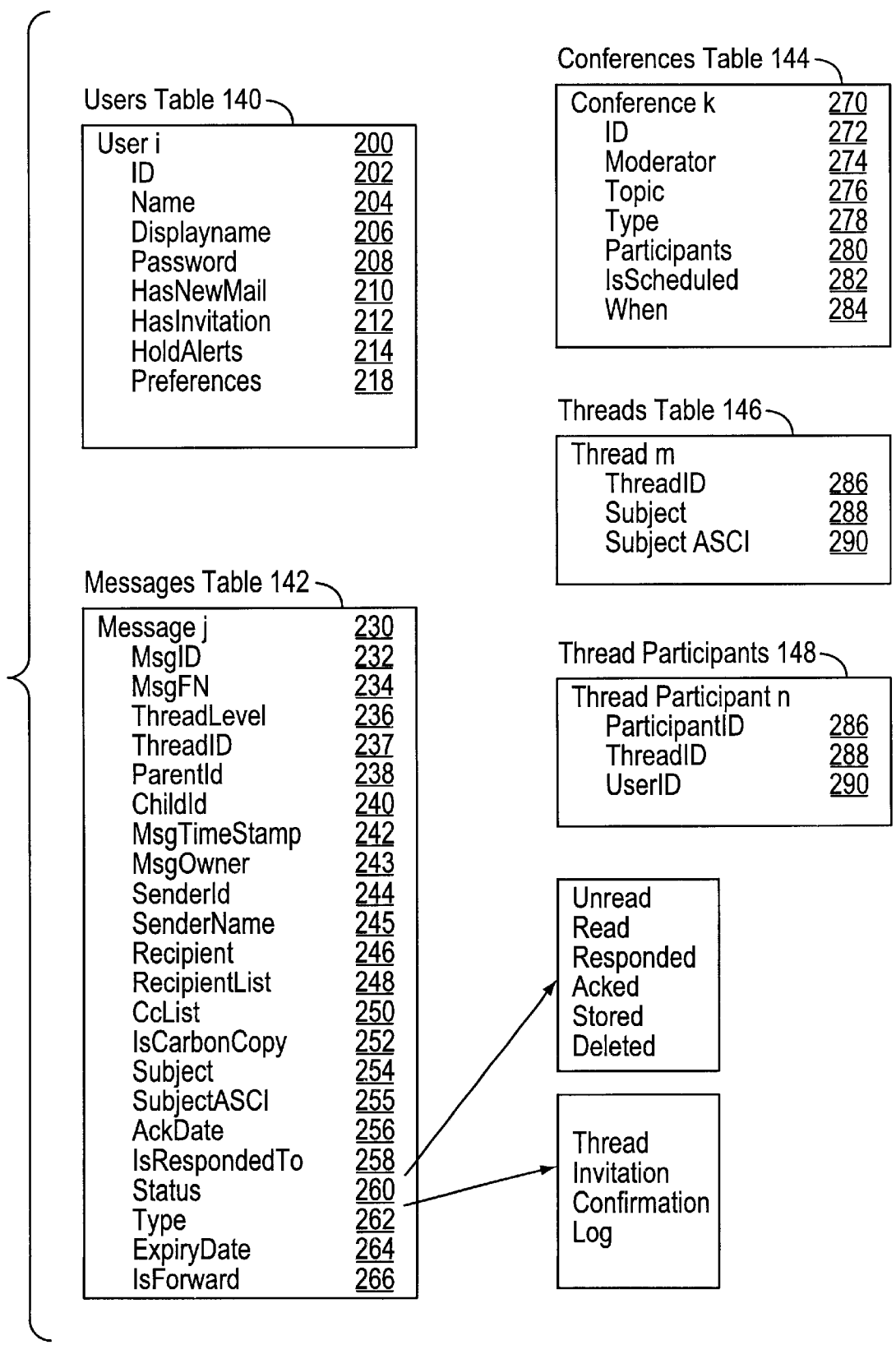
FIG. 2 is a block diagram of the database tables 140, 142, 144, 146, 148 from FIG. 1.

Referring to FIG. 2, there is shown a block diagram of the database tables 140, 142, 144, 146, 148 from FIG. 1. The users table 140 holds information pertaining to authorized users of the communication board (i.e., the server application 114). The users table 140 fields include:

| | |
|---|---|
| Id | Unique number automatically assigned to each user. [primary key] |
| Name | Assigned name for user's account. Used to logon with. |
| DisplayName | User's name as it appears in the heading of their Comm Board. |
| Password | To restrict account access by unauthorized users. |
| SortPrefs | User's sorting preferences - a 3 character code: c=chronological, r=reverse chronological, s=subject, e=sender |
| ExpiryPref | Number of days after which a message expires and is deleted. |
| HasNewMail | Flag is set to true when user has unread mail. |
| HasInvitation | Flag is set to true when user has been invited to join a conference. |
| HoldAlerts | Flag is true if user does not want alerts for new messages, etc to interrupt their session. |

The messages table 142 holds information pertaining to individual messages. Each participant in a message owns an individual message record. This allows for personalized manipulation of a given message. The messages table 142 fields include:

| | |
|---|---|
| MsgId | Unique number assigned automatically to each message. [primary key] |
| MsgFileName | Name of file that contains message body text. |
| ThreadLevel | Number 1–6 designating message's level in thread. |
| ThreadId | Id of corresponding Threads table record. |
| ParentId | Id of message that is above this message in the message thread. Value is zero if message is at top of thread. |
| ChildId | Id of message that is below this message in the message thread. Value is zero if message is at the bottom of thread. |
| MsgTimeStamp | Year, month, day, hour, minute and second when message was sent. |
| MsgRecOwner | Name of user that owns this message record (sender or recipient). |
| SenderId | User Id of message sender. Corresponds to id in Users table. |
| SenderName | User name of message sender. |
| SenderNameASCI | SenderName sort number. |
| Recipient | User name of message recipient. |
| RecipientList | Complete comma delimited list of recipients. |
| CcList | Complete comma delimited list of carbon copy recipients. |
| IsCarbonCopy | Flag is true if recipient is in ccList rather than recipientList. |
| Subject | Message subject or conference name. |
| SubjectASCI | Subject sort number. |
| AckDate | Date message was acknowledged rather than responded to. |
| IsRespondedTo | Flag is true if message has been responded to. |
| Status | Message status contains one of these values: unread, read, repliedTo, acked, stored, deleted, abandoned. |
| Type | Type of message contains one of these values: thread, announcement, invitation, confirmation or log. A thread type is a message that appears as part of a thread. An announcement is a simple message sent to all users by default. Announcements do not allow for a reply. An invitation is automatically sent to users that are invited to a conference. A confirmation is automatically generated when a user responds to an invitation. A log is a complete record of a given conference. |
| ExpiryDate | Date message is to be expired (automatically deleted). |
| IsForward | Flag is true if message is forwarded. |
| ForwardThreadId | Id of thread being forwarded. |

A thread includes a first level message and subsequent replies, which can be added to the thread until the thread is closed by one of the thread participants issuing an explicit acknowledgment to one of the thread's messages. The threads table contains one thread record for each message thread that is unique by subject. The threads table 146 fields include:

| | |
|---|---|
| ThreadId | Unique number assigned automatically to each thread. [primary key] |
| Subject | Thread subject. |
| SubjectASCI | Sort number for subject. |

Whenever a user participates in a thread—that is, when he is a sender or recipient (even if only a CC recipient)—an entry is made by the server application 114 in the thread participants table 148. This table facilitates the gathering of message threads by subject for a given user. For example, the server application 114 would gather such information for a particular user by:

1) issuing a query in the ThreadParticipants table 148 to find ThreadIds of all threads a user with a particular UserID has participated in;
2) issuing a query in the Threads table 146 using the ThreadIDs from query 1 to identify the subject sort numbers (SubjectASCI) for the respective threads; and
3) issuing a query in the Messages table 142 with the SubjectASCI values from query 2) to identify all messages with the same subject for the user.

The thread participants table 148 fields include:

| | |
|---|---|
| ParticipantId | Unique number assigned automatically to each thread. [primary key] |
| ThreadId | Thread ID (correlated with thread subject). |
| UserId | ID of user who is thread participant. |

The conferences table 146 holds basic information about each conference. The conferences table 144 fields include:

| | |
|---|---|
| Id | Unique number assigned automatically to each conference. [primary key] |
| ModeratorId | User id of conference moderator. |
| Topic | Moderator assigned topic for conference. |
| Type | Type of conference contains one of these values: private, public. |
| Participants | Comma delimited list of users invited to join a private conference. |
| IsScheduled | Flag is true if the conference is scheduled for a later date as opposed [to?] immediately. |
| When | Time of conference if the conference is scheduled for a later time. |

Figure 3A:
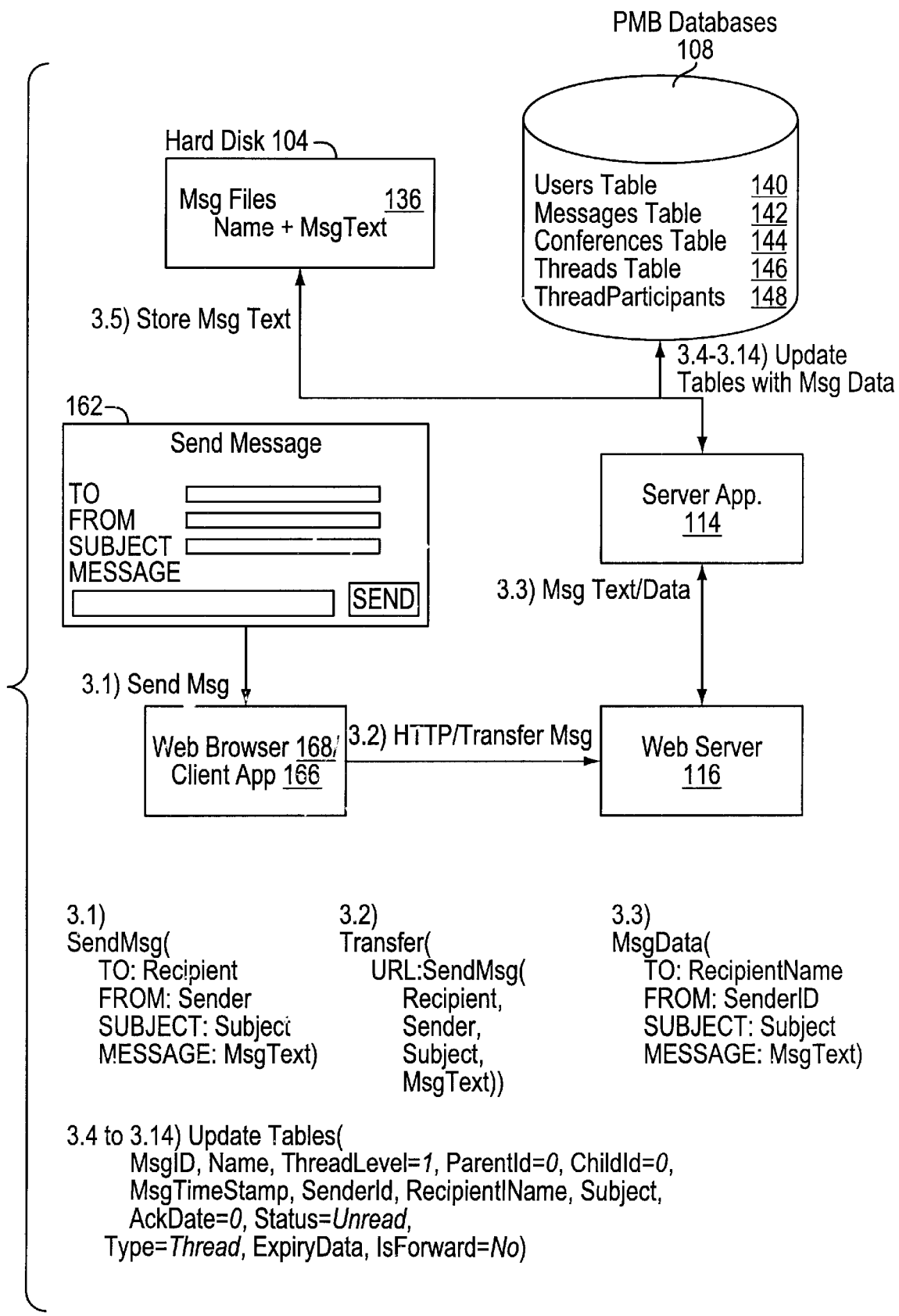
FIG. 3A is a data flow diagram illustrating the relationships between a client application 166 and web browser 168, the web server 116, the server application 114 and the PMB databases 108 when a user is sending a message.

Referring to FIG. 3A, there is shown a data flow diagram illustrating the relationships between a client application 166 and web browser 168, the web server 116, the server application 114 and the PMB databases 108 when a user is sending a message. The progression of operations shown in FIG. 3 is preceded by a SEND request issued by a user that is relayed via the user's web browser 168 to the sender application 114 via the web server 116. The sender application 114 in response returns a manifestation of a SEND page, which the web browser 168 displays as a SEND page visual 162. The user then completes at least a subset of the fields of the SEND page, which include: TO (i.e., one or more recipients), FROM (i.e., sender name), SUBJECT (i.e., message subject) and MSG (i.e., message text). It is assumed for this example that the message being sent is a level one message that starts a new thread of conversation.

The progression shown in FIG. 3A. begins when the user sends the message by selecting the displayed SEND button on the visual (3.1). In response to the selection of the SEND button (3.1) the web browser 168 (possibly with some intervention of the client application 166) issues an HTTP message transferring the SEND data to the web server 116. In accordance with the HTTP (hypertext transfer protocol) the browser 168 transmits the SEND data to the web server 116 (3.2). The message (3.2) includes the URL of the page for which the data is being transmitted (i.e., "SendMsg") and the encoded data. Upon receiving the message (3.2) the web server 116 decodes, re-packages, and transmits (3.3) the data to the server application 114.

Figure 3B:
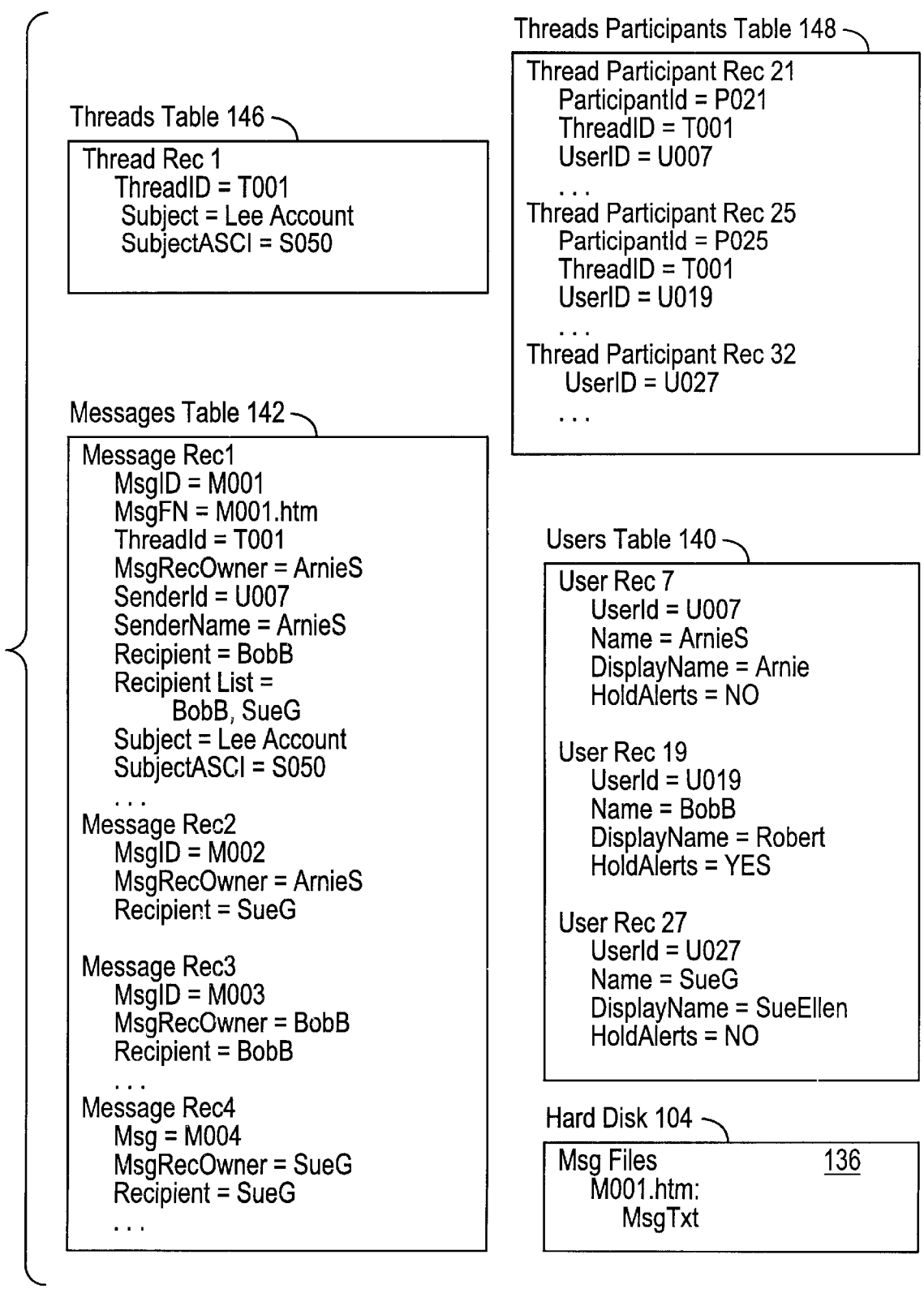
FIG. 3B is a block diagram of new records allocated in the various tables by the server application 114 while processing an exemplary send request.

Upon receiving the message (3.3), the server application 114 performs the following operations (3.4–3.14):

3.4) Determines from the users table 140 the IDs of sender and recipient(s).
3.5) Writes the MsgTxt to the hard disk (3.5) as a message file 136 and generates a corresponding file name (MsgFileName).
3.6) Generates a unique ID (MsgID) and sortable subject number (SubjectASCI) for the message.
3.7) Allocates in the messages table 142 2 N message records 143, N for the sender 143s and 1 for each of the N recipients 143ri (where i is an integer between 1 and N);
3.8) Updates each message record in accordance with the message data (only selected field are shown):
MsgID=message ID generated by server app. 114;
MsgFileName=message name generated by server app. 114;
ThreadLevel=1 (message is at the top of a thread);
ParentID=0 (message is at the top of a thread);
ChildId=0 (message is also at the bottom of a thread);
MsgRecOwner=name of a respective one of the participants SenderID=ID of sender;
SenderName=user name of sender;
Recipient=user name of a respective one of the N recipients;
RecpientList=list of N recipients;
Subject=subject completed by sender;
SubjectASCI=subject sort number generated by server app.
AckDate=0 (message not yet responded to);
Status=unread (message not yet received);
Type=thread (message is part of a thread);
3.9) Generates a unique thread ID (ThreadID) for the thread started by the message.
3.10) Allocates a single record 147 in the threads table 146;
3.11) Updates the thread table record:
ThreadID=thread ID generated by server app. 114;
Subject=subject completed by sender;
SubjectASCI=sort number for subject generated in step;
3.12) Generates a participant ID (ParticipantID) for each participant (1 for sender and 1 for each of the N recipients);
3.13) Allocates in the ThreadParticipants Table 148 N+1 records 149, one for the sender 149s and N for each of the N recipients 149ri (where i is an integer between 1 and N);

3.14) Updates each ThreadParticipant record 149 as follows:
ParticipantID=participant ID generated by server app. 114
ThreadID=thread ID generated by server app. 114
UserID=message name generated by server app. 114
ThreadLevel=1 (message is at the top of a thread);

Referring to FIG. 3B, there is shown an example of how, as a result of the send processing performed by the server application 114, multiple records of the respective tables are generated and cross-referenced. FIG. 3B assumes a simple example where a user with username ArnieS has sent a message to two co-workers, BobB and SueG. Information for these users is provided in the users table 140, which shows UserIDs (U007, U019, U027) and DisplayNames (Arnie, Robert, SueEllen) for ArnieS, BobB and SueG, respectively. Upon receiving the message the server application 114 creates four new message records M001–M004 in the messages table 142. Two messages (MsgId=M001, MsgId=M002) list ArnieS as MsgRecOwner; one of these has BobB as Recipient and the other has SueG as Recipient. The other two messages (MsgId=M003, MsgId=M004) are similar, but list BobB and SueG as respective MsgRecOwners. Multiple messages are created so each participant (sender or recipient) can independently manipulate their own messages. For the same message, a single new Threads table 146 record has been allocated (ThreadId=T001). This single record is associated with all messages having the same subject (i.e., "The Lee Account") and a corresponding unique index (S050). This same ThreadID is associated, for example, with any reply by any of the recipients of the original message as well as any subsequent replies by the original sender. The server application also allocates 3 thread participant records (with ParticipantIds=P021, 025, 032), one each for ArnieS, BobS and SueG. These participant records map the participants to their respective userIDs (U007, U019, U027) and to the new thread record (Threadid=T001) associated with the subject common to all messages.

Figure 4A:
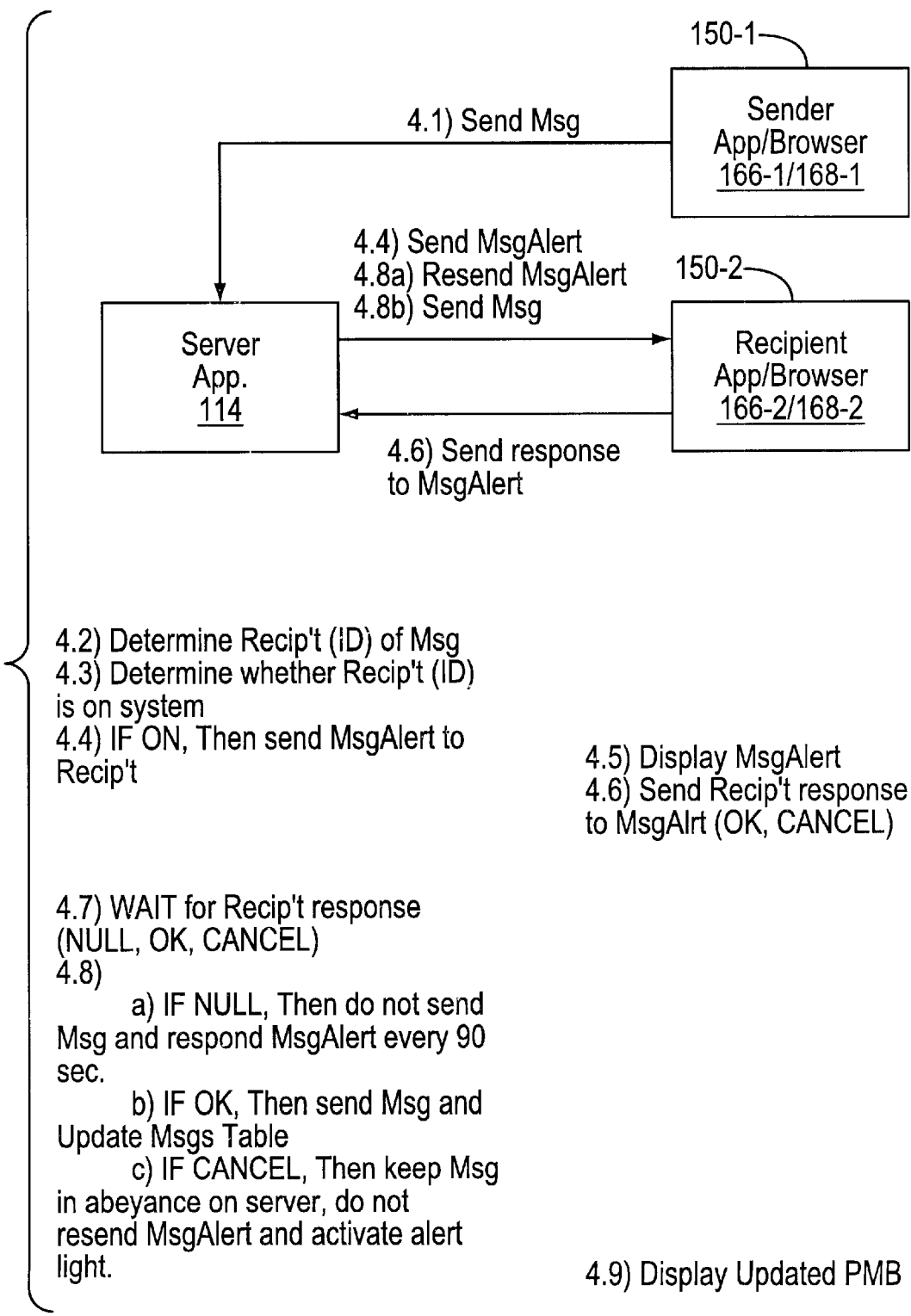
FIG. 4A is a data flow diagram illustrating steps performed by the web browser 168-1 of a message sender, the server application 114 and the web browser 168-2 of a message recipient for a message send procedure.

Referring to FIG. 4A, there is shown a data flow diagram illustrating steps performed by the web browser 168-1 of a message sender, the server application 114 and the web browser 168-2 of a message recipient for a message SEND procedure. The steps illustrated in FIG. 4A occur after the user of the client 150-1 has sent a message (4.1) designating a user of the client 150-2 as recipient and the server application 114 has processed that message as described in reference to FIG. 3A. As part of the processing described in reference to FIG. 3A the server application 114 determines the recipient(s) of the message (4.2). The server 114 then determines whether the recipient(s) is/are on the system (4.3). If the recipient is on the system, the server application 114 sends a message alert (MsgAlert) to the recipient (4.4). The MsgAlert (4.4) notifies the intended recipient that a first level message is waiting for him. The recipient application/browser 166-2/168-2 displays the alert in an alert window (4.5) that gives the recipient two response alternatives: OK or CANCEL (4.6). The recipient selects OK to indicate to the server application 114 that he wishes to receive the message. He selects CANCEL to indicate that he does not wish to receive the message and does not want to receive further alerts. The recipient can also choose not to respond to the alert at all. This commonly occurs when the recipient is away from his computer.

After sending the MsgAlert (4.1) the server application 114 waits (4.7) for the recipient's response. If the response is NULL, (meaning that the recipient did not respond for some predetermined time interval; e.g., 90 seconds) the server application 114 resends the MsgAlert (4.8a).

If the response is OK, the server application sends the Message (4.8b) and updates the messages table 142 to show that the message has been posted. This update involves changing the status 260 of the messages table records 230 for the sender and recipient of the message from "unread" to "read" 230. The server application 114 also sends at the same time any other messages which were in abeyance at the server 100 (i.e., messages previously sent but not OKed for delivery by the recipient). The status of each of these messages is also updated accordingly by the server application 114. The recipient application/browser 166-2, 168-2 then displays the messages in an open, threaded communication board format that is a key feature of the present invention. This display format is described below in reference to FIG. 4B. A unique aspect of the described sequence of operations is that a user is able to view their communication board messages instantly (that is, as soon as they issue an OK), without first needing to log on to a centralized bulletin board system. Another advantage of the present invention is that the messages are displayed with full threading, which is not possible with conventional instant messaging systems.

If the response is CANCEL, the server application 114 places the message in abeyance (i.e., does not send it) and sends another message to the application/browser 166-2, 168-2 causing a message indication to be displayed/played on the client user interface 158. For example, the message indication could be an alert light or a sound indication, among many other possibilities.

Figure 4B:
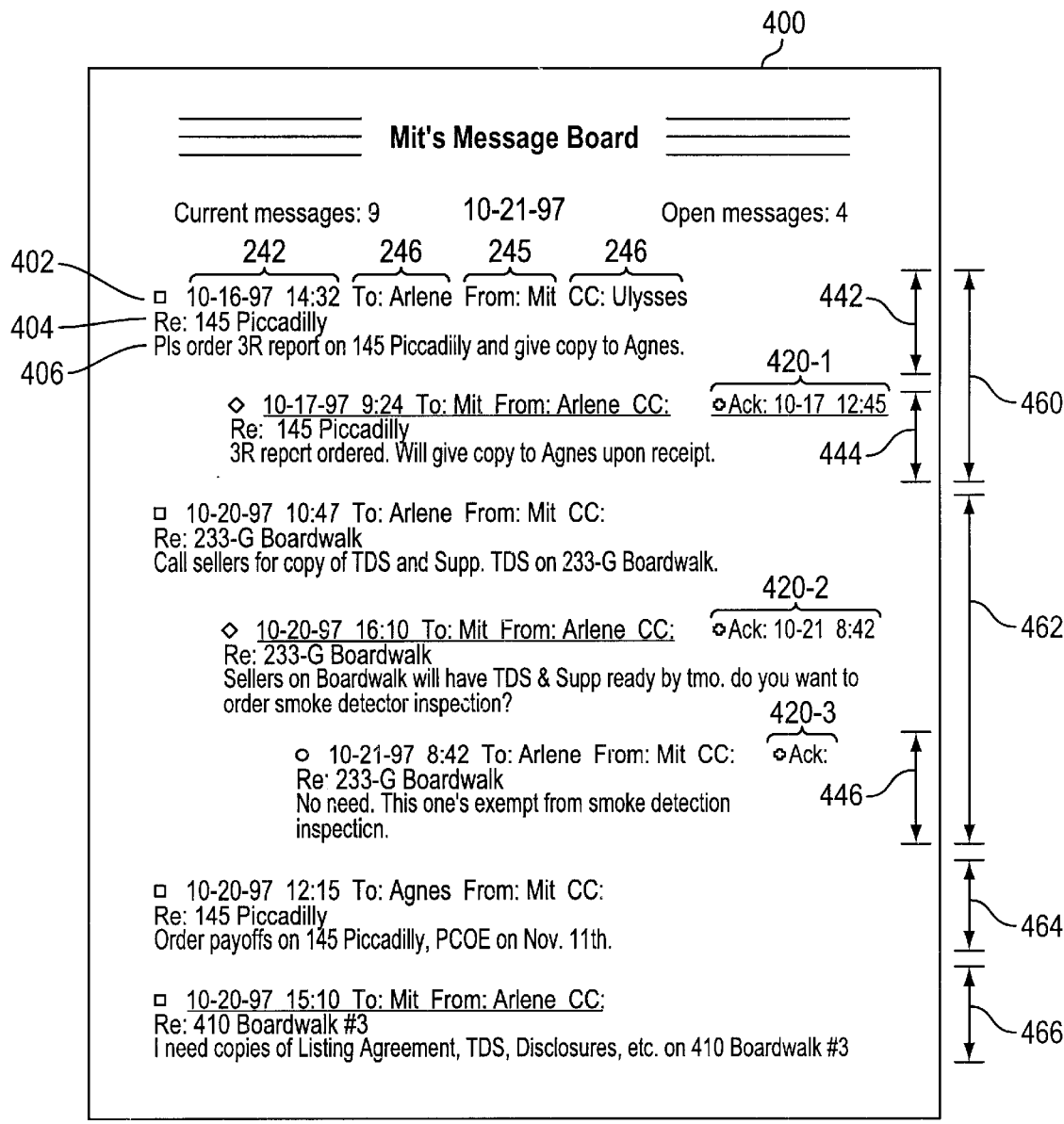
FIG. 4B is an image of a private communication board screen on which instant messages owned by one user are presented in a threaded, open format.

Referring to FIG. 4B, there is shown an image of a communication board format 400 employed by the present invention to display for a single user the contents and status of conversational threads (e.g., 460, 462, 464, 466) in which that single user has participated. This image is displayed as a visual 162 on the user's client computer by the application/browser 166-2/168-2 based on inputs received from the server application 114. The communication board 400 displays all messages and threads owned by a user regardless of subject. These messages are displayed until they are deleted by a participant, they expire, some event occurs that triggers their automatic deletion, or the system administrator deletes them. In addition to messages (including forwarded and carbon copy (cc) messages), the communication board 400 displays announcements broadcast to multiple users and conference notifications.

The communication board 400 lists for each message information from a corresponding messages record, including its MsgTimeStamp 242, Recipient 246, SenderName 245, CcList 250, Subject 254 and MsgText. In the illustrated embodiment the MsgTimeStamp 242, Recipient 246, SenderName 245 and CcList 250 are displayed on the first line 402 of a message, which is called the information line. The Subject 254 is displayed on the second line 404 and the MsgText 406 is displayed on subsequent lines.

In a preferred embodiment, the communication board display is private, meaning that each user can view only their messages (i.e., messages for which a user is listed as MsgOwner in the messages table 142). The present invention is able to support this private treatment of messages as it allocates for each one-to-one communication two message records 230, one owned by the Sender and one by the Recipient. A unique feature of the present invention is that messages and replies thereto appear simultaneously on the communication boards of both the sender and the recipient.

The client displays the messages with full threading information. That is, first level messages 442 are displayed with no indentation and lower level messages (i.e., replies 444 and replies to replies 446) are displayed with corresponding levels of indentation. The information necessary to maintain message threading is provided by the server application 114 from the Parent, Child, ThreadLevel and Threadid fields 238, 240, 236, 237 of the messages table 142. In particular, each displayed thread comprises a first level message and its children (family of replies). Note that many threads can have the same subject (e.g., the threads 460 and 464); however, each first level message with the same subject is displayed as a distinct thread.

To assist user recognition of the different message levels and the status of those messages (read, unread, etc.), the displayed embodiment employs color and icons in addition to indentation. In particular, first level messages are preceded by a filled-in square 408, second level messages (replies) are preceded by a filled-in diamond 410 and third level messages (replies to replies) are preceded by a filled-in circle. In the illustrated embodiment the information line of incoming messages is underlined with different colors depending on whether the message has been responded to (shown in purple) or need to be responded to (shown in blue). Alternatively, the information line of all incoming messages can be shown in one color (e.g., blue) and with underlining only when the incoming message has not yet been responded to. Note that these display features (indentation, color, icons) are not required by the present invention but are niceties to assist users in navigating the open, threaded communication board 400.

A novel feature of the present invention is message acknowledge (Ack), which allows a message recipient to agree to/acknowledge a particular message in such a way that their agreement/acknowledgment is unambiguously recorded by the server application 114. In the displayed embodiment the present invention displays an Ack field 420 alongside the information line 402 of all second and third level messages that indicates when and how (explicity or implicitly) a message was acknowledged. An Ack field 420 is not displayed next to first level messages in the preferred embodiment, but this could also be done in alternative embodiments. The acknowledge feature is useful in business applications where it can be used to memorialize agreement; e.g., to proposals contained in messages. The acknowledge feature also serves to inform senders as to whether or not recipients have read their messages.

When a user acknowledges a message (explicitly or implicitly) the server application 114 displays the date and time of the acknowledgment on both the sender and the recipient's communication boards 400. Explicit selection results in the closing of a thread, meaning that no more replies on that particular thread are possible and that subsequent conversations on the same subject would require a new first level message. In the displayed embodiment the Ack field of closed threads are underlined with a characteristic color (e.g., red) on the communication boards of both participants (e.g., see the Ack field 420-1).

A user can implicitly acknowledge a received message by replying to that message (e.g, by sending a third level message). In this case the server application 114 fills in the Ack line 420 of the second level message with the date and time the third level message was sent. When such a reply is sent the server application 114 does not close the thread as the reply merits its own acknowledgement. As a result, the server application 114 does not display the Ack field 420 with the characteristic color of a closed thread (e.g., see the Ack field 420-2).

If the recipient of a second or third message has not replied or acknowledged to such a message, the Ack field 420 is left blank on the sender's communication board 400 (e.g., see the Ack field 420-3). Therefore, at all times a sender is able to determine the current status of their outgoing messages without needing to login to another service—i.e., the status is displayed through the visual cues presented on the communication board screen 400.

In the preferred embodiment, information lines 402 for incoming messages have a hyperlink function such that selecting the underlined portion of the information line causes the application server 114 to return a reply screen/visual 162 that is partially filled out with the appropriate Recipient, Sender and Subject. The message reply procedures implemented in the present invention are described below, in reference to FIG. 5. There is no hyperlink function associated with the information lines of the outgoing messages.

As an example of these features, refer to FIG. 4B, which shows the communication board 400 for the user, "Mit". The communication board 400 shows Mit has 9 current messages and 4 open messages, which are messages that have not been closed/acknowledged). The underlined message headers are associated with replies to Mit and the plainly-displayed message headers are associated with messages sent by Mit. This example includes four threads 460, 462, 464, 466. The thread 460 comprises two messages of the following levels:

level 1 msg 442, to Arlene from Mit; and level 2 reply 444 to the level 1 msg;

Each message is displayed in open format, meaning that its text can be read without selecting/opening the message. For example the first level message 442 has the following openly displayed MsgText:

"Pls order 3R report on 145 Piccadilly and give copy to Agnes."

The message 442 was responded to by Arlene, whose reply 444 includes the following MsgText:

"3R report ordered. Will give copy to Agnes."

In response to Arlene's 444, which clearly closed out the conversation, Mit sent an explicit acknowledgement that caused the server application 114 to close the thread 460. Thus, the Ack field 420-1 of the message 444 is shown underlined, indicating thread closure.

Due to the symmetry with which the message records are created (i.e, two message records created per communication pair), similar message information is displayed in real time on the communication boards of all participants to a thread. For example, referring to FIG. 4C, there is shown a portion of Arlene's communication board 400A listing some of the same threads 460, 462 as Mit's board 400. In particular, Arlene's thread 460A and messages 442A, 444A correspond to Mit's thread 460 and messages 442, 444. Note that, on both boards 400 and 400A, the Ack information 420-1 for the corresponding messages 444 and 444A is identical. However, the information lines of the messages 444 and 444A differ. That is, on Mit's board, the information line of the message 444 (from Arlene to Mit) is underlined but, on Arlene's board, the corresponding information line is not underlined. This because Arlene was the sender of this message. Other differences between Arlene's and Mit's boards are due to the fact that Arlene and Mit participate in different threads with different users.

Figure 4D:
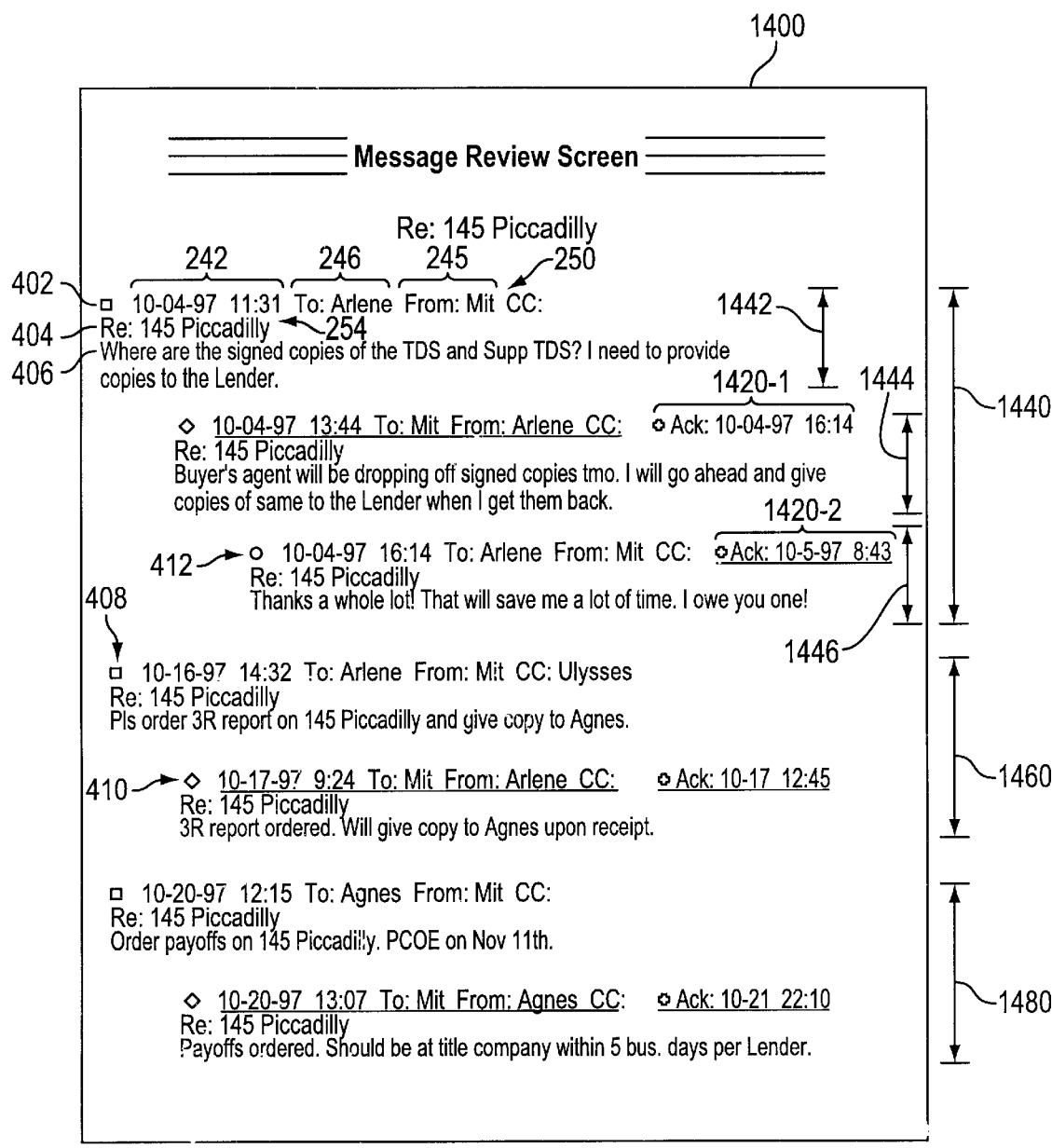
FIG. 4D is an image of a private message review board that presents for one user all of the user's messages having a common subject.

A user can choose an alternative view of their messages by using the message review board feature of the present invention. A message review board presents a view of all messages in the user's message folder (i.e., stored messages) with a common subject. For example, referring to FIG. 4D, which shows a message review board 1400, the threaded, instant messages shown are all associated with the same subject 1404 ("145 Piccadilly") and are owned by the user, "Mit". The message review board presents the messages in the same manner as a communication board. The underlined message headers are associated with replies to Mit and the plainly-displayed message headers are associated with messages sent by Mit. The example of FIG. 4D includes three threads 1440, 1460, 1480. The thread 1440 comprises three messages of the following levels:

level 1 msg 1442, to Arlene from Mit level 2 reply 1444 to the level 1 msg; and a level 3 reply 1446 to the level 2 reply;

Each message is displayed in open format, meaning that its text can be read without selecting/opening the message. For example the first level message 1442 has the following openly displayed MsgText:

"Where are the signed copies of the TDS and Supp TDS? I need to provided copies to the lender."

The message 1442 was responded to by Arlene, whose reply 1444 is displayed on Mit's message review board 1400. Arlene's reply 1444 includes the following MsgText:

"Buyer's agents will be dropping off signed copies tmo. I will go ahead and give copies of same to the Lender when I get them back."

Mit replied to the reply 1444 with another reply 1446:

"Thanks a whole lot. That will save me a lot of time. I owe you one!"

By sending this reply 1446 Mit implicitly acknowledged the reply 1444 from Arlene. Consequently, the thread 1440 is still open and the server application 114 sets the date and time of the acknowledgment 1420-1 to the date and time (10-04-97 16:14) Mit sent the reply 1446.

In response to the reply 1446, which clearly closed out the conversation, Arlene sent an explicit acknowledgement that caused the server application 114 to close out the thread. Thus, the Ack field 1420-2 of the message 1446 is shown underlined, indicating thread closure.

The preceding description is directed to an embodiment of the present invention where the communication boards are private and provide instant, open display of threaded messages. Alternative and equally novel embodiments of communication systems can employ various combinations of these concepts (privacy, instant messaging, threading and open display). For example, the teachings of the present invention could be employed in the following novel systems:

1) public bulletin boards with open display of messages;
2) e-mail systems with open display of messages;
3) e-mail systems with threading of messages;
4) private bulletin boards with no other unique features;
5) private bulletin boards with instant messaging;
6) private bulleting boards with instant messaging and open display; and
7) instant messaging systems with threaded of messages.

Descriptions of these embodiments are not provided herein as their respective implementations should be apparent from the descriptions already provided. Other embodiments consistent with these teachings and descriptions will occur to the reader skilled in the art and are within the scope of the present invention. Having described the communication board concept, the message reply process is now described.

Figure 5A:
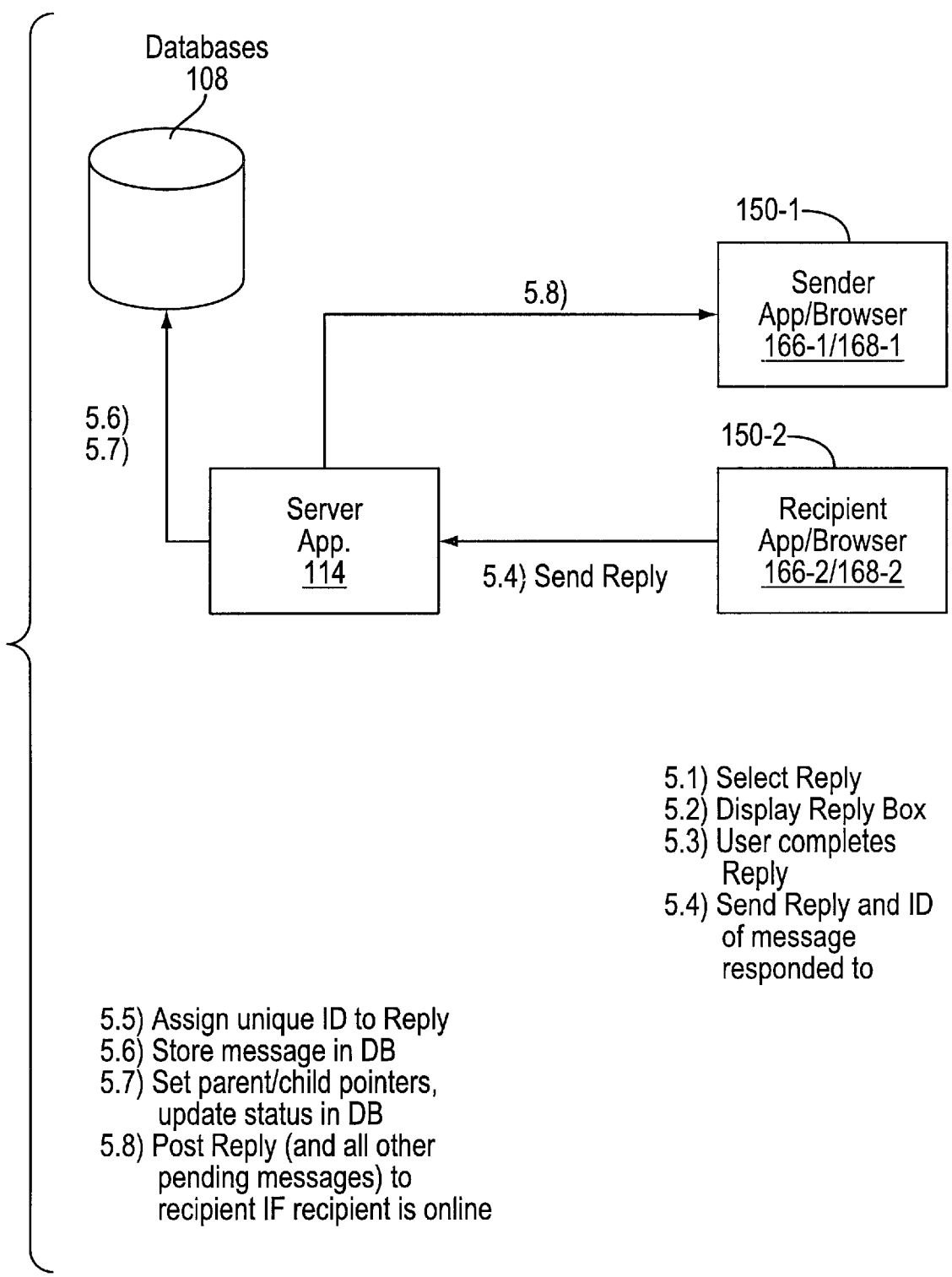
FIG. 5A is a data flow diagram illustrating steps performed by a web browser 168-1 of a message replier, the server application 114, and a web browser 168-2 of a message reply recipient for a message reply procedure.

Referring to FIG. 5A, there is shown a data flow diagram illustrating steps performed by a web browser 168-1 of a message replier, the server application 114, and a web browser 168-2 of a message reply recipient for a message reply procedure. The steps illustrated in FIG. 4A occur after the user of the client 150-2 has received a message (4.1) from a user of the client 150-1. Upon displaying a message on their communication board as described in reference to FIG. 4, a user can choose to reply to that message by selecting a reply option from a menu, an icon, or other equivalent methods (5.1). Once the user has selected the reply option a reply box is displayed (5.2) that allows the user to specify the reply's recipient and subject (these fields are filled in by default with the sender's information) and MsgText. The reply box description could be sent by the server application 114 or could be generated by the client application 166-1. The user fills in the reply (5.3), and then sends it off to the server application (5.4). Key information conveyed to the server in the reply includes the MsgId of the message responded to.

In response, the server application 114 assigns a unique MsgID to the reply (5.5), generates corresponding message records 230 for the reply sender and recipient (5.6) and updates database 108 records accordingly, including setting parent and child pointers to and from other message records 230 (5.7). The server application 114 then posts its reply to the indicated recipients (e.g., the user of the client 150-1) IF they are online (5.8). Note that, unlike first level messages, the server application 114 does not issue queries to recipients asking if they would like to a reply to be sent. Instead, the server application 114 pushes replies to recipients. Morever, every time it pushes one reply, the server application 114 pushes all other replies held in abeyance (except for first level messages not yet accepted). An illustration of the databases 108 reflecting processing by the server application 114 in response to a reply is now described in reference to FIG. 5B.

Figure 5B:
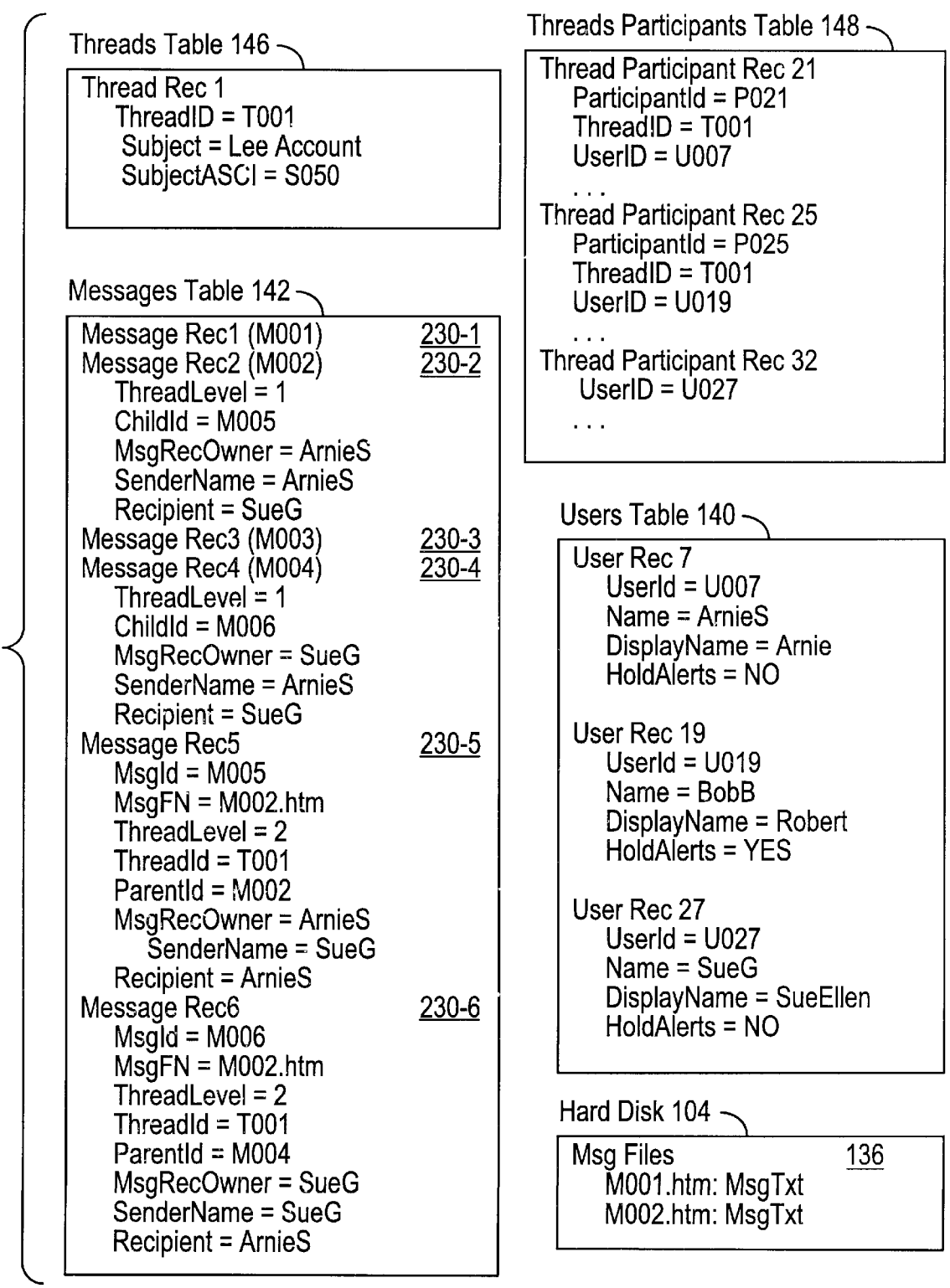
FIG. 5B is a block diagram of new records allocated in the various tables by the server application 114 while processing an exemplary reply request.

Referring to FIG. 5B, there is shown an example of how, as a result of the reply processing performed by the server application 114, multiple records of the respective tables are generated and cross-referenced. FIG. 5B assumes a simple example where SueG has responded to the message sent by ArnieS (refer to discussion of FIG. 3B). Upon receiving the reply message the server application 114 creates two new message records M005, M006 in the messages table 142. one One of these messages (MsgId=M005) lists ArnieS as MsgRecOwner and Recipient and SueG as Sender. The other message (MsgId=M006) is similar, but lists SueG as MsgRecOwner and sender and ArnieS as Recipient. A new Threads table 146 entry has not been allocated as the subject (i.e., "The Lee Account") and subject index (S050) for the reply are already represented by the Thread T001. Nor are new ThreadParticpant table 148 entries allocated. This is because the two participants in the reply (ArnieS and SueG) have appropriate records (with ParticipantIds=P021 and 032) in the ThreadParticipants table 148.

Figure 6:
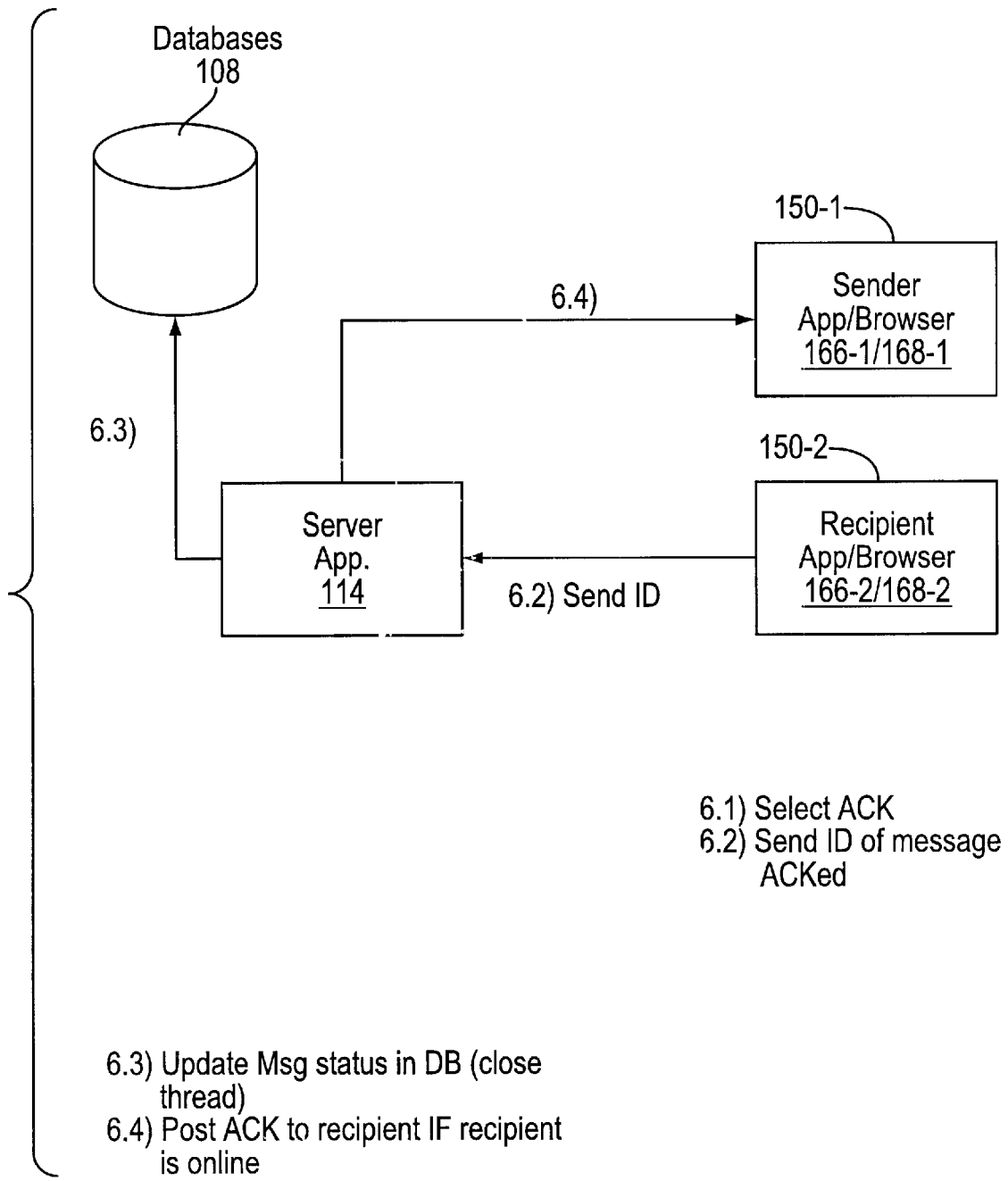
FIG. 6 is a data flow diagram illustrating steps performed by the web browser 168-1 of a message acknowledger and the server application 114 for a message acknowledge procedure.

Referring to FIG. 6, there is shown a data flow diagram illustrating steps performed by the web browser 168-1 of a message acknowledger and the server application 114 for a message acknowledge procedure. The steps illustrated in FIG. 4A occur after the user of the client 150-2 has received a reply message (5.7) from a user of the client 150-1. A user can choose to acknowledge explicity a message displayed on their communications board 400 by selecting an Ack option from a menu, icon, or other equivalent means (6.1). In response, the client application/browser 166-2/166-3 relays pertinent information (including MsgId) for the message being explicitly acknowledged to the server application 114 (6.2). The server application 114 processes the message acknowledgment as described in reference to FIGS. 4A–4C and updates the databases 108 accordingly (6.3), principally by changing the status of the relevant message record to "ACKed" and completing the AckDate 256 (FIG. 2). The server application 114 then posts the acknowledgement to the respective communications boards 400 of both participants (i.e., the sender using the client 150-1 and the recipient using the client 150-2) as described in reference to FIGS. 4B–4C (6.4). In a preferred embodiment the acknowledgment is only sent when the sender is online.

Alternatively, as described above, an acknowledgment can be sent implicitly as the result of a recipient of other than a first level message responding to that message. In this situation the server application 114 allocates new message records 230 in the same manner as for a reply (FIG. 5B); i.e., the Status 260 of those records is not listed as Acked and the AckDate 256 (FIG. 2) is not filled in. Additionally, the IsRespondedTo flag of the parent messages is set.

An example of the databases 108 resulting from the processing of an acknowledgment is not shown given the similarity of these results to those in the reply case, already described in reference to FIG. 5B.

In addition to the communication board features described above, the present invention provides additional conference, whisper, talk and mail modes. It is a key feature of the present invention that these modes are integrated with the communications board features. It is now described reference to FIG. 7 how the server application 114 supports conference mode.

Figure 7A:
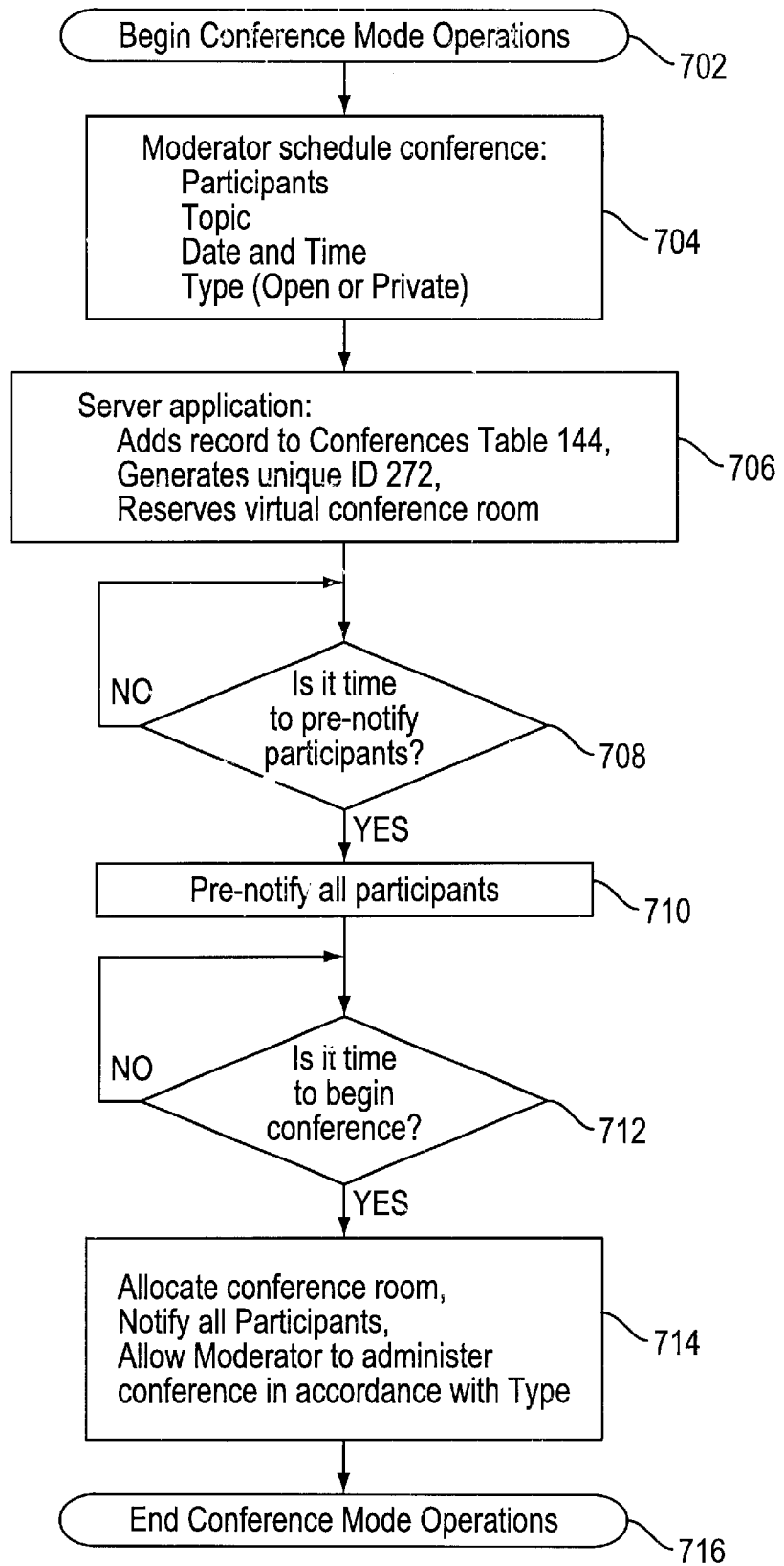
FIG. 7A is a flow chart illustrating steps by which the server application 114 schedules and implements a conference.

Referring to FIG. 7A, there is shown a flow chart illustrating steps by which the server application 114 schedules a conference, notifies conference participants and holds the conference. As the first step in scheduling a conference a user/moderator begins conference mode operations (702). The moderator then schedules a conference (704) by defining its:

- participants (one or more users if conference is private, not necessary when conference is open);
- topic;
- data and time; and
- type (open or private), where open means that any user can participate in the conference and private means that a user can only participate if invited by the moderator.

This information is entered by the moderator on a conferences page 162 generated by a browser 168 from information (typically formatted as ACTIVE SERVER PAGES) forwarded by the server application 114. The completed conference page 162 is returned to the server application 114, which allocates a new record 270 in the conferences table 144 (706). The server application 114 updates the fields (706) of the new conference record 270 as follows:

| | |
|---|---|
| ID | set to a unique ID generated by the application 114; |
| Moderator | set to the user name of the moderator; |
| Topic | set the topic defined by the user on the conferences page 162; |
| Type | set to type (open or private) selected by the moderator; |
| Participants | set to participants entered by the moderator; |
| IsScheduled | set to 1 if the user indicated that the conference is to be scheduled for future as opposed immediately; and |
| When | date and time entered by moderator. |

Finally, the server application 114 schedules a virtual conference room for the future, or immediately, depending on when the conference is scheduled (706).

Depending on when the conference is scheduled, at an appropriate time (which could be immediately or sometime in the future) (708-Y) the server application 114 sends notifications to the conference participants (710).

Figure 7B:
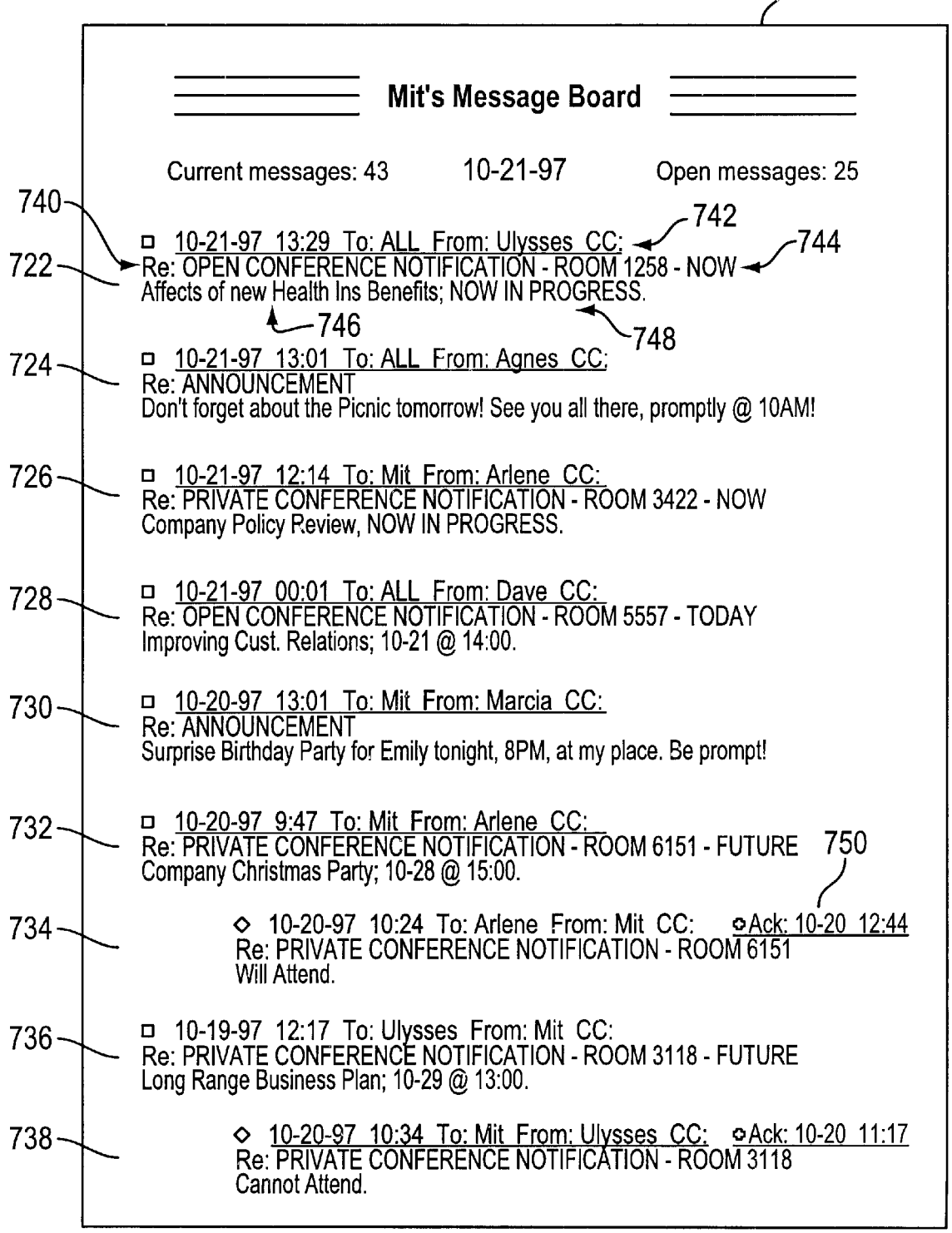
FIG. 7B depicts an exemplary communications board for a particular user illustrating conference notifications and announcements.

As shown in FIG. 7B, which is an image of user Mit's communication board 720 including conference notifications and announcements, the notifications are displayed similarly to messages (including the possibility of acknowledgements). In particular, open conference notifications, such as the notifications 722, 728, are sent to all users, and private conference notifications, such as the notifications 746, 752, and 756, are only sent to invited participants. Referring to an exemplary notification 722, all notifications display:

- a subject 740 that indicates the type of notification (e.g., PRIVATE CONFERENCE NOTIFICATION);
- the virtual conference room 742 (e.g., Room 1258);
- the date and time 744 of the conference (e.g., NOW);
- the topic 746 (e.g., "Affect of new Health Ins Benefits"); and
- an IN PROGRESS indication 748 if the conference is in progress.

Note that private conference notifications can be acknowledged in the same manner as messages. For example, in response to the notification 732 from Arlene regarding a private conference to discuss future Christmas parties, Mit issued a confirming reply 734, which was later acknowledged 750 by Arlene. The acknowledgment 750 also closes the thread consisting of the messages 732, 734.

FIG. 7B shows another feature of the present invention, announcements 724, 730, which are immediate messages broadcast to all users who are online.

Referring again to FIG. 7A, at the scheduled time the server application 114 hosts the conference (714) by:

- allocating the virtual conference room;
- notifying all participants again that the conference is starting (e.g., the IN PROGRESS notification 722);
- and allowing the moderator to administer the conference in accordance with the type of conference (e.g., if the conference is public, users can join at will, but if the conference is private, users can only join at if invited by the moderator).

One example of a conference session screen 770 is shown in FIG. 7C. The screen 770 includes an agenda 772 defined by the moderator, a comment screen 774 on which comments typed by participants on their own conference input screens are displayed and a list of participants 776. This screen 770 is displayed for all users who are participants in the conference by their respective browsers 168. In a preferred embodiment all conference information is logged by the application server 114 on the hard disk 104. The screen 770 includes an ANON button, which, when selected, allows a user to participate in the conference anonymously.

A unique feature of the present invention is whisper mode, which is implemented in conjunction with conference mode. During a conference two users who wish to carry on a private, unlogged conversation can enter whisper mode. When in whisper mode users view their conversation on a whisper mode screen on which only their comments are displayed. No other user can view comments made by whisper mode participants.

Figure 8A:
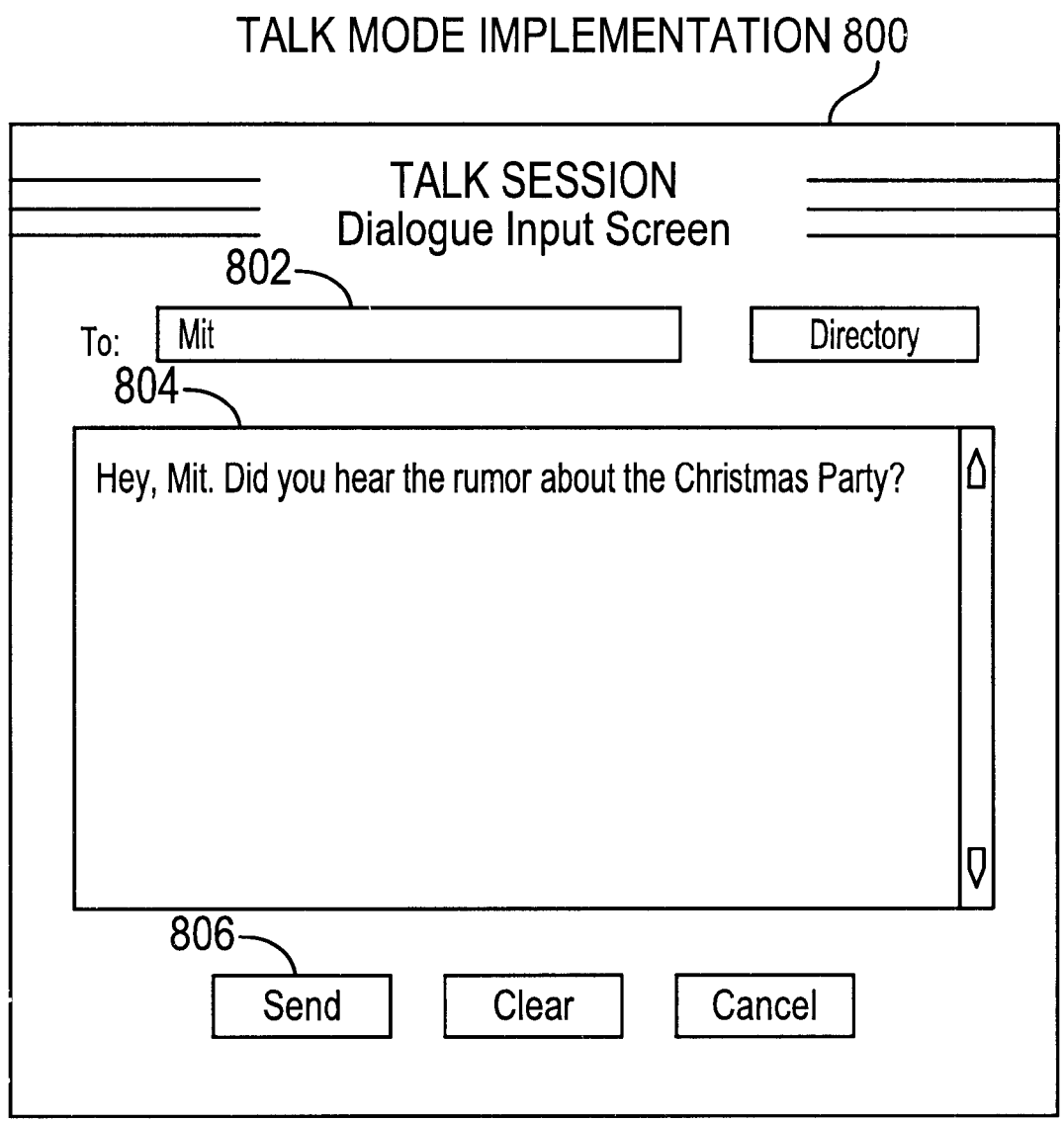
FIG. 8A is depicts a talk entry screen displayed by client Web browsers enabling a user to transition to talk mode.

Referring to FIG. 8, there is shown an exemplary talk session dialog input screen 800 in which a user (e.g., Arlene) enters a talk message 804 she would like to send to another user 802 (e.g, Mit) as part of a talk session. In the preferred embodiment, a user can start a talk session from any system mode other than conference mode. When the user is satisfied with the message 804, they select the send button 806, which causes the client application/browser 166, 168 to send the information from the talk session dialog input screen to the server application 114.

The server application 114 then determines whether the intended talk session participant (e.g., Mit is online). If the intended participant is online, the server application 114 sends him a talk mode incoming message box, which announces a new incoming message and gives the intended participant the option of checking the message (i.e., joining in the talk session) or declining to participate. The incoming message box is displayed for the intended recipient no matter which mode his client 150 is in. If the intended participant declines to talk or is not available, the server application 114 sends the requester (e.g., Arlene) a party not available message, indicating that the talk session cannot commence. If the intended participant is available and agrees to join the talk session, the server application 114 causes his client application/browser 166/168 to display the message and gives him an opportunity to respond.

Figure 8B:
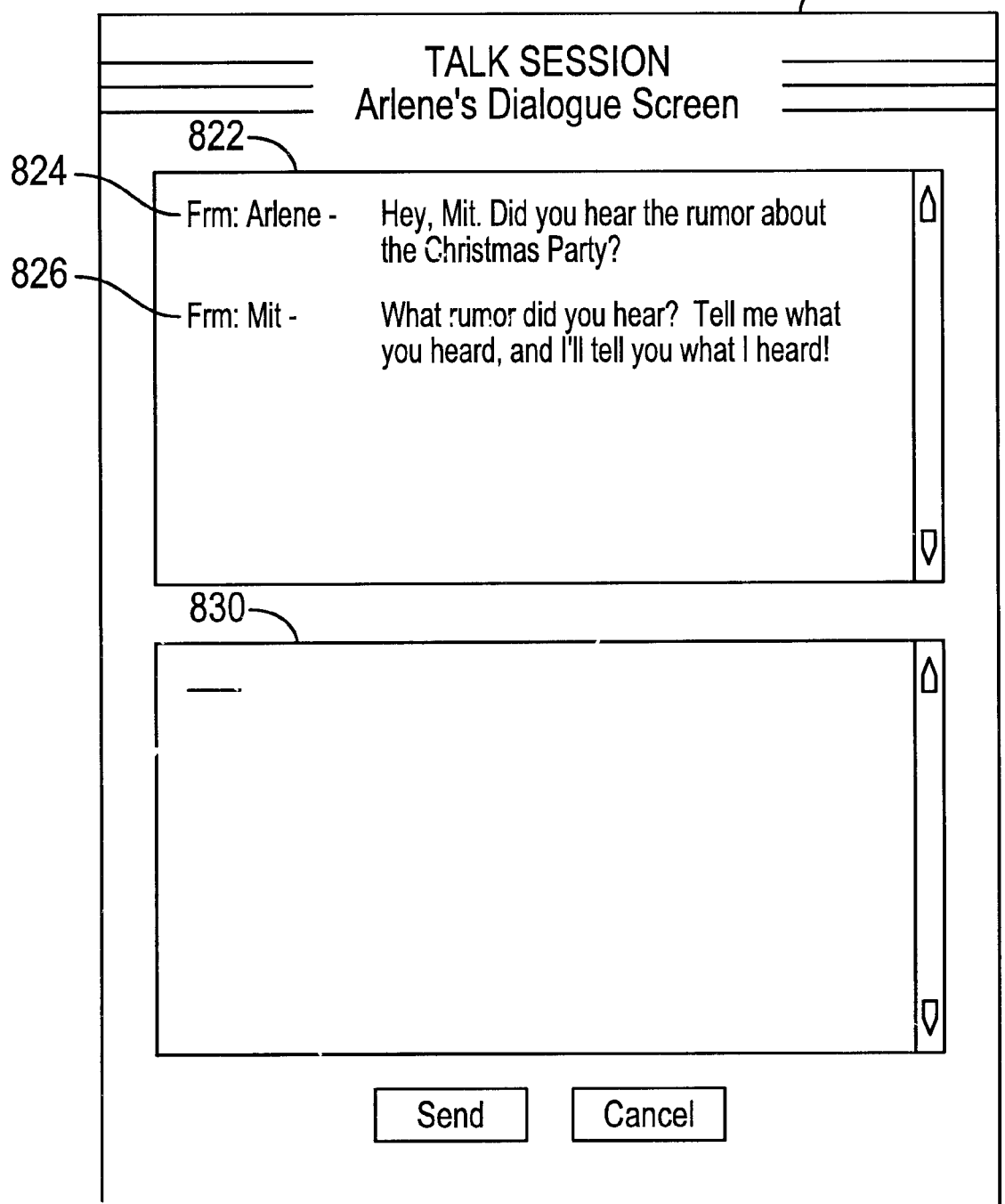
FIG. 8B is depicts a talk session screen displayed by client Web browsers during a talk session.

If the user elects to respond, he enters a message in a response input box and causes the appropriate browser 168 to send the information defined therein to the server application 114. The response input box is very similar to the talk session dialog input screen 800, shown in FIG. 8 and is therefore not described herein. Upon receiving the response, the server application 114 resends the first participant (e.g., Arlene) a dialog screen showing the second participant's response alongside the first participant's initial message. From this screen the first participant has the opportunity to send a reply back to the second participant. An exemplary talk dialog screen 820 for Arlene is shown in FIG. 8B. This screen shows in its upper section 822 Arlene's initial message 824 and Mit's response 826. The screen 820 also includes a response input box 830 in which Arlene can enter a subsequent response. The talk session can proceed with screens like the screen 820 until one of the users signals an intention to exit the talk mode.

As an example of the integration provided by the present invention, the server application 114 causes a incoming message alert to pop up during talk mode to notify a talk mode participant that he has a waiting communication board message. The alerted user can choose to check the message or CANCEL the alert, causing the server application 114 to initiate message processing operations already described in reference to FIGS. 4–6. While the user is checking his messages, the server application 114 causes the browser 168 used by the other talk session participant to display a talk session paused message. The talk session is re-activated when the participant checking his messages chooses to rejoin the talk session.

Talk session information is centrally maintained—in this case in a talk table 850 (stored in the database 108). Unlike most other modes (except for whisper mode), talk messages are not logged on the hard disk 104 server; therefore, the talk table 850 only includes a small set of status information for each talk session. In a preferred embodiment this status information includes:

| | |
|---|---|
| TalkSessID | Unique key for each talk session generated by the server |
| FirstParticipant | First participant user name |
| ScndParticipant | Second participant user name; |
| InActive | Set to indicate that one of participants has not yet agreed to join session; |
| MessageFlg | Set to indicate that one of the participants has paused session to check a new message; |
| MessageTS | Date and time when participant paused session to check new message. |

The server application 114 allocates a single talk record for each new talk session. There is no need for the server application 114 to keep track of individual responses as talk sessions are not logged in the preferred embodiment.

Another mode offered by the present invention is mail mode. Unlike conventional e-mail programs, in its mail mode the present invention is able to provide threaded mail over the Internet. An example of a mail screen 900 displayed for a particular user is shown in FIG. 9.

The mail screen 900 lists mail received 902 and sent 904 by a particular user (e.g., Mit). Each incoming e-mail message is treated by the server application 114 as a level one message that begins a respective e-mail thread. Replies to the incoming e-mail messages are indented on the mail screen 900, visually indicating their position as second level messages in their associated thread. For example, the incoming e-mail messages 906, 908 and 910 all have replies 906a, 908b, 910c.

Each of the incoming messages has a subject line (e.g., the subject 912 of the message 906) that is underlined. When a user selects the underlined subject line he prompts the server application 114 to return to the user's client application/browser 166/168 an e-mail reply box with most fields (such as sender, recipient, subject, date and time) already filled-in. The user then fills in the message text and sends the e-mail message. As with the other modes, after a reply is sent the mail screen 902 is immediately updated by the server application 114 with the threading information. Outgoing mail is handled in the same manner except for the problem that threading information may not be maintained by external e-mail servers that receive the outgoing messages.

As with the other system modes, e-mail information is centrally maintained—in this case in a mail table 920 (stored in the database 108) whose fields include:

| | |
|---|---|
| MailID | Unique key for each email message generated by the server; |
| MailTimeStamp | Date and time message was sent or received; |
| Sender | Sender Name; |
| SenderAdr | Sender e-mail address; |
| Recipient | Recipient Name; |
| RecipientAdr | Recipient e-mail address; |
| ThreadId | Unique Id for each mail Thread; |
| ThreadLevel | Top level messages have level = 1, Replies have level = 2; |
| Subject | Message subject; and |
| MsgFN | Name of file on hard disk 104 where MsgText is stored |

The server application 114 allocates a mail message record for each new e-mail (outgoing, incoming, or reply) and updates these e-mail fields in much the same way as in the message situation described above. As a result, the processing of e-mail messages by the present invention is not further described.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for threaded messaging of a message representation between participants including a sender and at least one recipient using a network of computers, comprising:

a memory configured to store a message table and a plurality of messages;

the message table including threading information for each message comprising parent, child, thread level and thread ID fields;

each message including respective threading information and a plurality of participants; and a delivery structure configured to deliver a representation of the message to the designated recipients, the delivery structure further configured to instantly display the representations in an open format wherein the delivery structure is configured to display the representations on a private message board that only shows communications sent to and by the recipient and which can be viewed only by the recipient, and wherein the messages do not need to be selected to be read by dynamically generating HTML representations of the messages.

2. The system of claim 1, wherein the delivery structure is configured to enable a recipient to acknowledge messages; such that, when the recipient acknowledges a particular message, the delivery structure notifies a sender of the recipient's acknowledgment of the particular message.

3. The system of claim 2, wherein the acknowledgment can be explicit or implicit, such that:

when the acknowledgment is explicit, the system closes a thread including the particular message; and when the acknowledgment is implicit, the system leaves open the thread including the particular message, the implicit acknowledgment occurring whenever a participant replies to the particular message.

4. The system of claim 3, wherein the explicit acknowledgment is employed by the participant to manifest acceptance of/agreement to contents of the message.

5. The system of claim 1, further comprising a server computer and a server mechanism executable in the server, the message table further comprising message records, each of which is associated with an owner, a subject, the sender and the recipient;

such that, whenever the sender sends a message to N other recipients the server mechanism allocates 2×N message records, N of which have respective ones of the recipients as the owner and the other N of which have the sender as the owner, all of the 2×N messages having the same sender and subject, respective pairs of the 2×N messages listing as the recipient a respective one of the recipients;

the display structure being additionally configured to display for each of the N+1 participants only those message for which he is owner.

6. The system of claim 5, wherein the server mechanism enables each of the participants to manipulate only those messages for which he is the owner.

7. The system of claim 6, wherein messages with the same subject, sender, recipient and message text are displayed nearly simultaneously to the respective owners of the messages.

8. The system of claim 1 further comprising a server computer and a server mechanism executable in the server, wherein the server mechanism is configured to queue at the server at least a subset of the messages addressed to the recipient without displaying to the recipient the representations of the subset until the recipient has approved transmission of at least one of the messages in the subset, after which the server mechanism displays the representations of the subset to the recipient user.

9. The system of claim 1, wherein the display structure displays the representation of the message along with a hyperlink field, the selection of which by the recipient causes the display structure to display to the recipient a reply window with at least some fields filled out with information associated with the hypertext field, enabling the recipient to formulate a reply to the sender of the message.

10. The system of claim 1, wherein the memory is configured to maintain a plurality of private message boards, such that, whenever a representation of the message is displayed on the private message board of one participant in the message, a corresponding representation of the message is displayed nearly simultaneously on the private message board of another participant in the message.

11. A communication board system for use in a computer network including a server, comprising:

a server application executable on the server; and a client application providing an interface between system users and the server application;

such that said client application and server application are configured cooperatively to provide each of said users with a respective view of a virtual bulletin board system illustrating history and content of at least a subset of messages, said respective view being accessible to and customizable for a corresponding one of said users, wherein each message including respective threading information and the history includes indentations of the content indicating a respective position of the content within the history; and wherein said respective view includes only those of said messages associated with conversations to which said corresponding user is a participant, and wherein the respective views display representations of the messages in an open format in which the content of the messages can be read without selecting the messages, by dynamically generating HTML representations of the messages.

12. The communication board system of claim 11, further comprising:

a data repository in which the server application stores information about system users and messages exchanged between said users.

13. The communication board system of claim 12, wherein the data repository comprises:

a message table including message records, each of which is associated with a message having a sender, recipient, owner, subject and thread id;

such that, whenever a user sends a message to N other users, the server application allocates a message family of 2×N message records, N of which have respective ones of the other users as the owner and the other N of which have the first user as the owner, all of the 2×N messages having the same sender, subject and thread id, respective pairs of the 2×N messages listing as the recipient a respective one of the other users, the sending user and other users being thread participants.

14. The communication board system of claim 13, wherein, when a first user sends a first level message to a second set of users using the client application, the server application is configured in response to:

allocate the family (first level family) of message records for the first level message;

generate a unique thread id and associate the unique thread id with each of the first level family;

update each member of the first level family with the sender, recipient, owner and subject information for a respective thread participant;

issue a message alert to the client applications of each of the other users;

transmit a representation of a respective message record to the client application of each of the second set of users who agrees to delivery of the message; and hold in abeyance transmission of a representation of a respective message record to each of the second set of users who does not agree to delivery of the message.

15. The system of claim 14, wherein, when an additional user sends a reply to a message from another user using the client application, the server application is configured in response to:

allocate the family (reply family) of message records for the reply message;

associate the unique thread id from a parent family with each member of the reply family, the parent family being the message records associated with the message from the another user;

update each member of the reply family with the sender, recipient, owner and subject information for a respective participant in the reply message;

link members of the reply family with related message records of the parent family; and transmit a representation of a respective reply message record to the client application of the another user.

16. The communication system of claim 15, wherein, when the additional user explicitly acknowledges an incoming message using the client application, the server application is configured in response to:

update the message records associated with the thread that includes the incoming message to show that the thread is closed, and append each response;

transmit a representation of the incoming message to the client applications of participants in the thread that includes the incoming message conveying that the thread is closed.

17. The communication system of claim 15, wherein, when a third user implicitly acknowledges an incoming message using the client application, the server application is configured in response to:

update the message records associated with the thread that includes the incoming message to show that the thread is responded to;

transmit a representation of the incoming message to the client applications of participants in the thread that includes the incoming message conveying that the thread is responded to.

18. The communication board system of claim 11, wherein the respective views display the representation of a message along with a hyperlink field, the selection of which by the user causes the server and client applications cooperatively to display to the user a reply window with at least some fields filled out with information associated with the hypertext field, enabling the user to formulate a reply to the message.

19. The communication board system of claim 11, wherein messages with identical subject, sender, recipient and thread id can be provided nearly simultaneously on the respective views provided to the respective owners of the messages.

20. The communication board system of claim 11, wherein the server application and the client application are browser-based, enabling the communication board system to be implemented on any computer network compatible with Internet-based protocols.

21. The communication board system of claim 20, wherein the computer network is selected from:

the Internet;

an intranet; or an extranet.

22. A system for open display bulletin boards for use by a plurality of participants in a network of computers, comprising:

a computer configured to provide a bulletin board system a memory configured to store a plurality of messages;

the messages include threading information for each message comprising parent, child, thread level and thread ID fields;

the messages include a plurality of participants;

the participants include a sender and at least one recipient; and a delivery structure configured to deliver the messages, the delivery structure further configured to instantly display the representations in an open format wherein the computer is configured to display the messages on a plurality of private message boards, each of which only shows communications sent to and by a respective participant and which can be viewed only by the respective participant, and wherein the messages do not need to be selected to be read by dynamically generating HTML representations of the messages.

23. The system of claim 22, wherein the computer is configured to enable recipients to acknowledge messages; such that, when the recipient acknowledges a particular message, the computer notifies a second participant in the particular message of the recipient's acknowledgment of the particular message, and wherein the system includes a safeguard to prevent deletion of the messages without acknowledgment.

24. The system of claim 23, wherein the acknowledgment can be explicit or implicit, such that:

when the acknowledgment is explicit, the computer closes a thread including the particular message; and when the acknowledgment is implicit, the computer leaves open the thread including the particular message, the implicit acknowledgment occurring whenever the recipient replies to the particular message.

25. The system of claim 24, wherein the explicit acknowledgment is employed by the recipient to manifest acceptance of/agreement to contents of the particular message.

26. The system of claim 22, further comprising:

a message table including message records, each of which is associated with a message having a sender, recipient, owner and subject;

such that, whenever the sender sends a message to N recipients, the computer allocates 2×N message records, N of which have respective ones of the recipients as the owner and the other N of which have the sender as the owner, all of the 2×N messages having the same sender and subject, respective pairs of the 2×N messages listing as the recipient a respective one of the other participants;

the computer being additionally configured to display for each of the N+1 participants only those message for which he is owner.

27. The system of claim 26, wherein the server mechanism enables each of the users to manipulate only messages of which he is the owner.

28. The system of claim 27, wherein messages with the same subject, sender, recipient and message text are displayed nearly simultaneously to the respective owners of the messages.

29. The system of claim 22, wherein, whenever a first representation of a particular message is displayed on the private message board of one participant in the particular message, a corresponding representation of the particular message is displayed nearly simultaneously on the private message board of another participant in the particular message.

30. The system of claim 22, further comprising a server computer and a server mechanism executable in the server wherein the server mechanism is configured to queue at the server at least a subset of the messages addressed to the recipient without displaying the representations of the subset until the recipient has approved transmission, after which the server mechanism displays the representations of the subset to the recipient.

31. The system of claim 22, wherein the computer displays the representation of the message along with a hyperlink field, the selection of which by the recipient causes the computer to display to the recipient a reply window with at least some fields filled out with information associated with the hypertext field, enabling the recipient to formulate a reply to the sender of the message.

32. A private message board system for use in a network of computers including a server computer, comprising:

a server mechanism executable in the server, the server mechanism configured to:
provide a plurality of private bulletin boards for each of a plurality of users of the system, wherein each of said private bulletin boards shows history of messages associated with conversations involving a respective user, wherein each message including respective threading information and the history includes indentations that delineate a message's place within the history; and
display representations of the messages in an open format that only shows communications sent to and by the respective user, and wherein by dynamically generating HTML representations of the messages, the messages do not need to be selected to be read.

33. The system of claim 32, wherein the server mechanism is configured to enable users to acknowledge messages; such that, when the user acknowledges a particular message, the server mechanism notifies a second user who is a participant in a thread containing the thread of the user's acknowledgment of the particular message.

34. The system of claim 33, wherein the acknowledgment can be explicit or implicit, such that:

when the acknowledgment is explicit, the server mechanism closes the thread including the particular message; and
when the acknowledgement is implicit, the server mechanism leaves open the thread including the particular message, the implicit acknowledgement occurring whenever the user replies to the particular message.

35. The system of claim 32, further comprising:

a message table including message records, each of which is associated with a message having a sender, recipient, owner and subject;
such that, whenever the user sends a message to N other users, the server mechanism allocates 2×N message records, N of which have respective ones of the other users as the owner and the other N of which have the user as the owner, all of the 2×N messages having the same sender and subject, respective pairs of the 2×N messages listing as the recipient a respective one of the other users.

36. The system of claim 35, wherein messages with the same subject, sender, recipient and message text are displayed nearly simultaneously on the private message boards of the respective owners of the messages.

37. The system of claim 32, wherein the server mechanism is configured to display nearly simultaneously with its posting a particular message on the private message boards of all participants in the message.

38. The system of claim 24, wherein the server mechanism is configured to queue at the server at least a subset of the messages addressed to the user without displaying the representations of the subset until the user has approved transmission, after which the server mechanism displays the representations of the subset to the user.

39. The system of claim 24, wherein the server mechanism displays a representation of the message along with a hyperlink field, the selection of which by the user causes the server mechanism to display to the user a reply window with at least some fields filled out with information associated with the hypertext field, enabling the user to formulate a reply to the sender of the message.

40. A method for threaded instant messaging for use in a computer network, comprising the steps of:

maintain threading information of said messages comprising parent, child, thread level and thread ID fields;
displaying a representation of said threading information along with said messages;
displaying messages sent over the network involving a user of the network so that only said user can view messages sent and received by said user;
displaying said messages in an open format so that content of said messages is viewable without selection;
immediately making said messages available for viewing by said user whenever said user is online by dynamically generating HTML representations of the messages;
whenever a user sends a message to N other users, allocating a message family of 2×N message records, N of which have respective ones of the other users as the owner and the other N of which have the first user as the owner, all of the 2×N messages having the same sender, subject and thread id, respective pairs of the 2×N messages listing as the recipient a respective one of the other users, the sending user and other users being thread participants; and
when a first user sends a first level message to a second set of users:
allocating the family (first level family) of message records for the first level message;
generating a unique thread id and associate the unique thread id with each of the first level family;
updating each member of the first level family with the sender, recipient, owner and subject information for a respective thread participant;
issuing a message alert to each of the other users;
transmitting a representation of a respective message record to each of the second set of users who agrees to delivery of the message; and
holding in abeyance transmission of a representation of a respective message record to each of the second set of users who does not agree to delivery of the message.

41. The method of claim 40, further comprising the steps of:

when an additional user sends a reply to a message from another user,
allocating the family (reply family) of message records for the reply message;

associating the unique thread id from a parent family with each member of the reply family, the parent family being the message records associated with the message from the another user;

updating each member of the reply family with the sender, recipient, owner and subject information for a respective participant in the reply message;

linking members of the reply family with related message records of the parent family; and transmitting a representation of a respective reply message record to the another user.

42. The method of claim 41, further comprising the steps of:

when the additional user explicitly acknowledges an incoming message, updating the message records associated with the thread that includes the incoming message to show that the thread is closed, and appending each response; and transmitting a representation of the incoming message to participants in the thread that includes the incoming message conveying that the thread is closed.

43. The method of claim 41, further comprising the steps of:

when the additional user implicitly acknowledges an incoming message, updating the message records associated with the thread that includes the incoming message to show that the thread is responded to, and appending each response; and transmitting a representation of the incoming message to the client applications of participants in the thread that includes the incoming message conveying that the thread is responded to.

44. A system for threaded messaging of a message representation between participants including a sender and at least one recipient using a network of computers, comprising:

a memory configured to store a message table and a plurality of messages;

the message table including threading information for each message comprising parent, child, thread level and thread ID fields;

each message including respective threading information and a plurality of participants;

a delivery structure configured to deliver a representation of the message to the designated recipients, the delivery structure further configured to instantly display the representations in an open format wherein the messages do not need to be selected to be read by dynamically generating HTML representations of the messages; and a server computer and a server mechanism executable in the server, the message table further comprising message records, each of which is associated with an owner, a subject, the sender and the recipient;

such that, whenever the sender sends a message to N other recipients the server mechanism allocates 2×N message records, N of which have respective ones of the recipients as the owner and the other N of which have the sender as the owner, all of the 2×N messages having the same sender and subject, respective pairs of the 2×N messages listing as the recipient a respective one of the recipients; and the display structure being additionally configured to display for each of the N+1 participants only those message for which he is owner, and wherein the server mechanism enables each of the participants to manipulate only those messages for which he is the owner.

45. A system for open display bulletin boards for use by a plurality of participants in a network of computers, comprising:

a computer configured to provide a bulletin board system a memory configured to store a plurality of messages;

the messages include threading information for each message comprising parent, child, thread level and thread ID fields;

the messages include a plurality of participants;

the participants include a sender and at least one recipient;

a delivery structure configured to deliver the messages, the delivery structure further configured to instantly display the representations in an open format wherein the messages do not need to be selected to be read by dynamically generating HTML representations of the messages; and a message table including message records, each of which is associated with a message having a sender, recipient, owner and subject;

such that, whenever the sender sends a message to N recipients, the computer allocates 2×N message records, N of which have respective ones of the recipients as the owner and the other N of which have the sender as the owner, all of the 2×N messages having the same sender and subject, respective pairs of the 2×N messages listing as the recipient a respective one of the other participants;

the computer being additionally configured to display for each of the N+1 participants only those message for which he is owner, and wherein the computer enables each of the participants to manipulate only messages of which he is the owner.

* * * * *